(12) United States Patent
Brandau et al.

(10) Patent No.: US 10,414,901 B2
(45) Date of Patent: Sep. 17, 2019

(54) STABILIZED RUBBERS

(71) Applicants: ARLANXEO Deutschland GmbH, Dormagen (DE); AQUASPERSIONS LTD, Halifax, Yorkshire (GB)

(72) Inventors: Sven Brandau, Strasbourg (FR); Andreas Kaiser, Strasbourg (FR); Bjorn Loges, Strasbourg (FR); Robert Staeber, Ebsdorfergrund (DE); Alan Bewsher, Ripponden (GB); Paul Smith, Copley (GB)

(73) Assignees: ARLANXEO DEUTSCHLAND GMBH, Dormagen (DE); AQUASPERSIONS LTD, Halifax, Yorkshire (GB)

( * ) Notice: Subject to any disclaimer, the term of this patent is extended or adjusted under 35 U.S.C. 154(b) by 0 days.

(21) Appl. No.: 15/116,023

(22) PCT Filed: Feb. 3, 2015

(86) PCT No.: PCT/EP2015/052209
§ 371 (c)(1),
(2) Date: Aug. 2, 2016

(87) PCT Pub. No.: WO2015/114169
PCT Pub. Date: Aug. 6, 2015

(65) Prior Publication Data
US 2017/0137607 A1     May 18, 2017

(30) Foreign Application Priority Data
Feb. 3, 2014 (EP) .................................... 14153698

(51) Int. Cl.
| | |
|---|---|
| *C08K 5/00* | (2006.01) |
| *C08L 9/02* | (2006.01) |
| *C08K 5/375* | (2006.01) |
| *C08K 5/13* | (2006.01) |
| *C08K 5/134* | (2006.01) |
| *C08L 9/04* | (2006.01) |
| *C08L 15/00* | (2006.01) |
| *C08L 21/00* | (2006.01) |
| *C08L 101/00* | (2006.01) |
| *C08J 3/20* | (2006.01) |
| *C08J 3/24* | (2006.01) |
| *C08K 5/526* | (2006.01) |

(52) U.S. Cl.
CPC .............. *C08K 5/375* (2013.01); *C08J 3/203* (2013.01); *C08J 3/24* (2013.01); *C08K 5/005* (2013.01); *C08K 5/13* (2013.01); *C08K 5/1345* (2013.01); *C08K 5/526* (2013.01); *C08L 9/02* (2013.01); *C08L 9/04* (2013.01); *C08L 15/005* (2013.01); *C08L 21/00* (2013.01); *C08L 101/00* (2013.01); *C08J 2309/02* (2013.01)

(58) Field of Classification Search
CPC .......... C08K 5/005; C08K 5/05; C08K 5/105; C08K 5/13; C08K 5/132; C08K 5/37
See application file for complete search history.

(56) References Cited

U.S. PATENT DOCUMENTS

| | | | |
|---|---|---|---|
| 3,068,297 A | 12/1962 | Weingarten | |
| 3,700,637 A | 10/1972 | Finch, Jr. | |
| 4,503,196 A | 3/1985 | Rempel et al. | |
| 4,536,568 A | 8/1985 | Wunder | |
| 4,581,417 A | 4/1986 | Buding et al. | |
| 4,631,315 A | 12/1986 | Buding et al. | |
| 4,746,707 A | 5/1988 | Fiedler et al. | |
| 4,795,788 A | 1/1989 | Himmler et al. | |
| 4,816,525 A | 3/1989 | Rempel et al. | |
| 5,116,534 A | 5/1992 | Mollet et al. | |
| 5,164,434 A | 11/1992 | Liwak et al. | |
| RE34,548 E | 2/1994 | Fiedler et al. | |
| 5,304,589 A * | 4/1994 | Davidson | C08L 23/0815 524/178 |
| 5,807,941 A | 9/1998 | Tsuji et al. | |
| 6,683,136 B2 | 1/2004 | Guo et al. | |
| 6,967,228 B2 * | 11/2005 | DeDecker | C08F 293/00 525/332.7 |
| 7,323,505 B2 | 1/2008 | Thibaut | |
| 7,560,048 B2 * | 7/2009 | Broussard | C08K 5/13 252/397 |
| 7,951,875 B2 | 5/2011 | Guerin et al. | |

(Continued)

FOREIGN PATENT DOCUMENTS

| | | |
|---|---|---|
| CN | 1201052 A | 12/1998 |
| DE | 2539132 C2 | 4/1987 |

(Continued)

OTHER PUBLICATIONS

Angew. Makromol. Chem. 1986, pp. 145-146 and 161-179.

(Continued)

*Primary Examiner* — Rip A Lee
(74) *Attorney, Agent, or Firm* — Norris McLaughlin PA

(57) ABSTRACT

Novel rubbers are provided which are stabilized by a specific combination of at least three different anti ageing compounds. Said rubbers dispose of an increase storage stability as well as an improved colour stability over the short term as well as over the long term. The invention also relates a process for producing said novel rubbers, vulcanizable mixtures based thereon, a process for producing vulcanizates from those mixtures and the vulcanizates obtained.

20 Claims, No Drawings

(56) References Cited

U.S. PATENT DOCUMENTS

| | | | |
|---|---|---|---|
| 2003/0144395 A1* | 7/2003 | Broussard | C08K 5/13 524/317 |
| 2003/0236348 A1 | 12/2003 | Wendling et al. | |
| 2004/0092634 A1 | 5/2004 | Arnoldi et al. | |
| 2008/0249214 A1* | 10/2008 | Wegmann | C08F 257/02 524/101 |
| 2010/0036016 A1 | 2/2010 | Wegmann et al. | |
| 2010/0130396 A1* | 5/2010 | Dong | C10M 141/06 508/563 |
| 2010/0130660 A1* | 5/2010 | Knobloch | C08K 5/0016 524/289 |
| 2017/0096544 A1 | 4/2017 | Knobloch et al. | |

FOREIGN PATENT DOCUMENTS

| | | |
|---|---|---|
| EP | 0471250 A1 | 2/1992 |
| JP | 02085220 A | 3/1990 |
| JP | 2000103906 A | 4/2000 |
| JP | 2009-221387 A * | 10/2009 ............. C08L 71/12 |
| JP | 2010077334 A2 | 4/2010 |
| WO | 03081690 A2 | 10/2003 |
| WO | 2005023886 A1 | 3/2005 |

OTHER PUBLICATIONS

Houben-Weyl (1961), Methoden der Org. Chemie, Makromolekulare Stoffe 1, p. 484.

Ullmann's Encyclopedia of Industrial Chemistry, 6th Edition, vol. 31, pp. 345-355. 2008.

Brockmann, R., "Fatty Acids", Ullmann's Encyclopedia of Industrial Chemistry, 6th Edition, vol. 13, pp. 75-108. Dusseldorf, Federal Republic of Germany. 2008.

International Search Report from co-pending Application PCT/EP2015/052209 dated Mar. 6, 2015, 2 pages.

European Search Report from co-pending Application EP14153698 dated Apr. 3, 2014 2 pages.

* cited by examiner

STABILIZED RUBBERS

FIELD OF THE INVENTION

The invention relates to novel rubbers comprising a specific combination of anti ageing compounds, a process for producing said novel rubbers, vulcanizable mixtures based thereon, to a process for producing vulcanizates from these mixtures and the vulcanizates obtained in this way.

BACKGROUND OF THE INVENTION

The ageing of organic polymers or vulcanizates thereof can lead to a change of various properties like e.g. an increased hardness or brittleness of the polymers. In the alternative a softening, a loss of the elastomeric properties or of the mechanical strength is recognized. Cracking, surface changes or other changes e.g. of the electric properties may also be observed. Undesirable odours and discolouration phenomena are also often observed.

The aforementioned property changes and phenomena are due to different ageing processes as described e.g. in Handbuch für die Gummi-Industrie, 2. völlig neu bearbeitete Ausgabe, 1991, Seite 423 ff, Bayer AG, Geschäftsbereich Kautschuk, Anwendungstechnik.

In order to prevent or reduce said ageing processes it is known in the art to add anti ageing compounds which can be typically grouped into three different categories:
  (i) mono- or oligofunctional secondary aromatic amines
  (ii) mono- or oligofunctional substituted phenols
  (iii) heterocyclic mercapto group containing compounds.

The effect of said anti-ageing compounds typically slows down when the polymer or vulcanizate to be protected is exposed to higher temperatures, in particular for longer time periods. Further on it is desirable that the anti ageing compounds to be used do not have a colouring effect per se, but just to the contrary provide a good colour stability to the rubber or vulcanizate thereof and may be used in combination with peroxide or sulfur based vulcanizing agents. Additionally some of the known anti ageing compounds are toxicologically risky, which means that the rubber/vulcanizate stability is only achieved by using harmful substances. Besides the diphenyl amines this applies e.g. to phenolic antioxidants like Vulkanox® BKF which is categorized as H361f, i.e. suspected of damaging fertility.

As there is an increasing need for a high ageing stability of rubbers and vulcanizates thereof with regard to storage and colour stability, in particular under exposure to high temperatures, it is a continuing task to provide new and improved concepts for preventing and reducing the ageing processes in rubbers and vulcanizates. This aim also encompasses reducing the amount of anti ageing compounds to the extent possible without lowering the stabilizing effect.

In particular rubbers with unsaturated C=C double bonds in the polymer chain like nitrile rubbers or styrene-butadiene rubbers are subject to ageing phenomena.

Nitrile rubbers and processes for producing such nitrile rubbers are known, see, for example, W. Hofmann, "Nitrilkautschuk", Berliner Union Stuttgart 1965, pages 51-54, however, no indication is provided how to further improve the storage stability of nitrile rubbers.

For the purposes of the present invention, nitrile rubbers, also referred to as "NBR" for short, are rubbers which are copolymers or terpolymers comprising repeating units of at least one α,β-unsaturated nitrile, at least one conjugated diene and optionally one or more further copolymerizable monomers. Partially or fully hydrogenated nitrile rubbers, also referred to as "HNBR" for short, are corresponding co- or terpolymers in which the C=C double bonds of the copolymerized diene repeating units are partially or fully hydrogenated.

For many years, NBR and HNBR have occupied an established position in the specialty elastomers sector. They possess an excellent profile of properties in the form of excellent oil resistance, good heat stability, excellent resistance to ozone and chemicals, wherein the heat stability being even more pronounced in the case of HNBR than in the case of NBR. NBR and HNBR also have very good mechanical and performance properties. For this reason, they are widely used in a wide variety of different fields of use, and are used, for example, for production of gaskets, hoses, belts and damping elements in the automotive sector, and also for stators, well seals and valve seals in the oil production sector, and also for numerous parts in the electrical industry, mechanical engineering and shipbuilding. A multitude of different types are commercially available, and these feature, according to the application sector, different monomers, molecular weights, polydispersities and mechanical and physical properties. Besides the standard types, there is increasing demand particularly for specialty types featuring contents of specific termonomers or particular functionalizations.

The storage stability as well as the colour stability of rubbers like nitrile rubbers, styrene butadiene rubbers ("SBR") or other types are frequently problematic. For the present purposes, storage-stable means that the Mooney viscosity as important specification criterion for many rubbers changes as little as possible during prolonged storage times, in particular at high temperatures. Furtheron for the present purposes, colour stable means that the rubber shows values ΔE as small as possible if determined according to CIEDE 2000 after storage at high temperatures.

JP 75,105,746 describes heat-resistant nitrile rubbers which are obtained by carrying out the coagulation of the latex by means of a mixture of tin dichloride and calcium chloride. The use of tin salts, however, is nowadays problematical for ecological reasons, especially since these tin salts are found in the nitrile rubber even after comprehensive subsequent washing of the nitrile rubber. The removal of the tin salts from the washing water is also associated with a high and therefore likewise undesirable outlay for purification.

According to Angew. Makromol. Chem. 1986, 145-146, 161-179, one measure for improving the storage stability of nitrile rubber is selective hydrogenation of the double bonds originating from the butadiene while at the same time retaining the triple bonds of the nitrile groups. The property changes achieved by the hydrogenation are desirable for many applications, but not for all. In addition, the hydrogenation is complicated and requires a series of additional process steps. As the glass transition temperatures are usually made compared to the unhydrogenated starting material by the hydrogenation such hydrogenation is not a suitable solution to the problem for all applications.

NBR is produced by emulsion polymerization, which firstly gives a NBR latex. The NBR solid is isolated from this latex by coagulation. Salts and acids are used for coagulation. In the coagulation of latices by means of metal salts, it is known that significantly larger amounts of electrolyte are required in the case of monovalent metal ions, e.g. in the form of sodium chloride, than in the case of polyvalent metal ions, e.g. in the form of calcium chloride, magnesium chloride or aluminium sulphate (Kolloid-Z. 154, 154 (1957)). It is also known from Houben-Weyl (1961), Methoden der Org. Chemie, Makromolekulare Stoffe 1, p. 484 that the use of polyvalent metal ions leads to "at least some inclusion of the emulsifier in the product". According to these references the electrolytes used have to be very carefully washed out again, but the finished product should also be free of the catalysts and emulsifiers of the process batch. Even small amounts of residual electrolytes may result in a deterioration of various properties.

According to the teaching of DE-A 30 43 688, it is possible to reduce the amount of electrolytes necessary for the latex coagulation by using either plant-based protein-like materials or polysaccharides such as starch and if appropriate water-soluble polyamine compounds as auxiliaries in addition to the inorganic coagulate in the electrolyte coagulation of latices. As inorganic coagulates, preference is given to alkali metal or alkaline earth metal salts. The specific additives make it possible to achieve a reduction in the amounts of salts used for quantitative coagulation of the latex. DE-A 3 043 688 gives no information how to improve storage and colour stability as a result of the production and/or work-up of the nitrile rubber.

The object of EP-A-1 369 436 is to provide nitrile rubbers having a high purity. The process of EP-A-1 369 436 starts out from typical nitrile rubbers. Nothing is said about the polymerization process except that an emulsion polymerization is carried out in the presence of salts of fatty acids and/or resin acids as emulsifiers. This is followed by coagulation of the latex by means of acids, optionally with addition of precipitants. As acids, it is possible to use all mineral and organic acids which allow the desired pH values to be set. In addition, it is possible to use additional precipitates, with mention being made of alkali metal salts of inorganic acids, e.g. sodium chloride and sodium sulphate, for this purpose. The fatty acids and resin acids formed as a result of the action of acid are subsequently washed out by means of aqueous alkali metal hydroxide solutions and the polymer is finally subjected to shear until a residual moisture content of less than 20% is obtained. As a result of this shearing action, the water or the residual moisture including the ion contents and other foreign substances present therein are removed. The Ca contents of the products disclosed in Examples 1 and 2 are only 4 and 2 ppm, respectively. EP-A-1 369 436 gives no information on the production of nitrile rubbers which display increased storage and colour stability.

EP-A-0 692 496, EP-A-0 779 301 and EP-A-0 779 300 all describe specific nitrile rubbers. The nitrile rubbers contain 10-60% by weight of unsaturated nitrile and have a Mooney viscosity in the range 15-150 or, according to EP-A-0 692 496, in the range 15-65 and all contain at least 0.03 mol of $C_{12}$-$C_{16}$-alkylthio group per 100 mol of monomer units, with this alkylthio group having at least three tertiary carbon atoms and a sulphur atom which is bound directly to at least one of the tertiary carbon atoms. The nitrile rubbers are in each case produced in the presence of a $C_{12}$-$C_{16}$-alkyl thiol having a corresponding structure as molecular weight regulator which functions as "chain transfer agent" and is thus incorporated as end group into the polymer chains.

With regard to the coagulation of the latex, EP-A-0 692 496, EP-A-0 779 301 and EP-A-0 779 300 disclose that any coagulants or single alkylated phenolic anti ageing compounds which are not further specified can be used. The focus is on nitrile rubbers which are essentially halogen-free and are disclosed to have a halogen content of not more than 3 ppm and which are claimed to have an advantageous property profile, good processability of the rubber mixtures and make low fouling of the mould possible during processing. The vulcanizates obtained are said to have a good combination of low-temperature resistance and oil resistance and possess good mechanical properties. Nothing is said about the property of storage and colour stability of the nitrile rubbers and vulcanizates thereof.

EP-A-0 488 550 describes stabilizer compositions comprising 1) sulfide having one or more sulfide groups —$CH_2$—S—$CH_2$—R, wherein R is $C_1$-$C_{20}$ alkyl, alkyl alkanoate or 2,4-bis(n-octylthiol)-6-4'-hydroxy-3',5'-di-tert.butylanilino) 1,3,5-triazin and at least two hindered phenols (2) and (3) one of which (3) is less sterically hindered than the other (2). Such compositions can be incorporated into polymers to make polymeric additives. These polymeric additives can be employed in polymer matrices to provide polymeric products having improved physical and mechanical properties. They are used in high concentrations of 1-4% by weight of the polymer and the focus lies on stabilizing acrylate-based rubbers. The use thereof shows some synergistic effect, however, there is neither any showing of an improved stability of the rubber's molecular weight nor any disclosure or teaching how to reduce the amount of the stabilizing system.

In U.S. Pat. No. 5,116,534 a combination of three different stabilizers is disclosed which are claimed to stabilize a broad variety of polymers. The combination consists of (i) a phenolic antioxidant, (ii) a thiodipropionic acid ester and (iii) a phosphite. With regard to the phosphite (iii) to be used alkyl substituted phenyl phosphites like TNPP (tri-nonylphenyl phosphite) are emphasized. Nowadays said phosphites, however, are considered harmful in view of their toxic by-products, in particular nonylphenol. U.S. Pat. No. 5,116,534 does not provide any hint whether or not said stabilizers are suited to increase the colour stability of the polymers.

WO-A-2009/138342 discloses the use of a combination of
a) a sterically hindered phenol bearing at least one sulfide group of the following formula

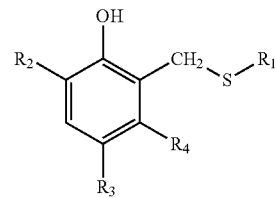

wherein
$R_1$ is $C_8$-$C_{12}$ alkyl
$R_2$ is hydrogen, $C_1$-$C_{12}$ alkyl, cyclohexyl, 1-methylcycloheyl, benzyl, α-methylbenzyl, α,α-dimethylbenzyl or —$CH_2$—S—$R_1$
$R_3$ is $C_1$-$C_{12}$ alkyl, benzyl, α-methylbenzyl, α,α-dimethylbenzyl or —$CH_2$—S—$R_1$, and
$R_4$ is hydrogen or methyl, and
b) a styrenated diphenylamine of the formula

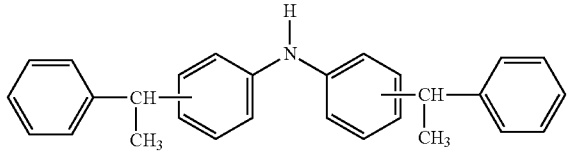

for stabilizing emulsion polymers or rubber latices. However, diphenyl amines are toxicologically critical.

JP 2010/077334A also discloses combinations of different stabilizers comprising a sulfur containing phenol-based antioxidant and an amin-based anti-ageing agent. Allegedly the use thereof for stabilizing nitrile rubbers results in an improved Mooney stability and an improved colour stability. With regard to the amounts of the sterically hindered phenols and amin-like stabilizers to be used a broad range is claimed. There is no disclosure or teaching provided how to generate further synergistic effects by using combinations of specific antioxidants.

EP-A-0 439 427 describes aqueous emulsions comprising 10 to 40% by weight, based on the emulsion, of antioxidants which comprise at least (A) one phenolic antioxidant, and/or (B) one thio dipropopionic acid ester and/or (C) an organic phosphite, besides 0.25 to 10% by weight of a surfactant being a salt of an organic acid, and 0.25 to 10% by weight of an alcohol. It is emphasized that such aqueous emulsion are storage stable, may be produced easily and are well suited for stabilizing a broad variety of polymers WO 2005/023886 A focuses on the stabilization of a) methylmethacrylate-butadiene polymers or styrene graft polymers using b) a sterically hindered phenolic antioxidant of formula (I), (II) or (III) or a mixture thereof and c) a thioether differing from that of formula (II).

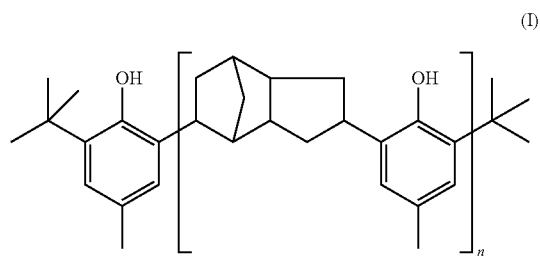
(I)

with n being from 1 to 10

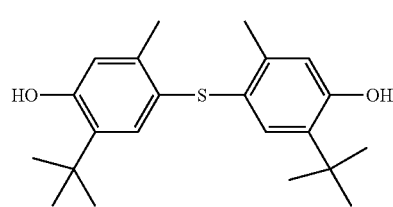
(II)

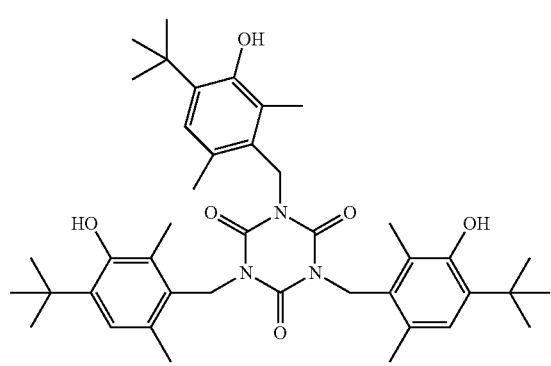
(III)

In WO-A-2002/14419 salts of sterically hindered phenols are used for stabilizing rubbers. The stabilizers are characterized by comprising at least two phenolic hydroxy groups. Preferred sterically hindered phenolic compounds are those of the following formula

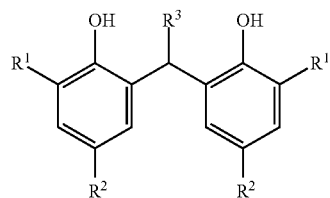

wherein $R^1$, $R^2$, and $R^3$ may identical or different, $R^1$, $R^2$ are $C_1$-$C_{12}$ alkyl or $C_5$-$C_8$ cycloalkyl and $R^3$ is hydrogen, $C_1$-$C_8$ alkyl or $C_5$-$C_6$ cycloalkyl. However, there is neither any disclosure nor any teaching how to further improve the stabilizing efficiency by using specific stabilizers in combination.

WO-A-2001/081458 discloses liquid stabilizing mixtures for organic polymers comprising
a) a liquid compound belonging to the group of sterically hindered phenols consisting of esters or mixtures of esters having general formula (I)

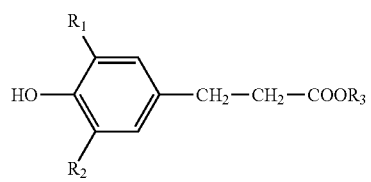

wherein
$R_1$ and $R_2$ are the same or different, represent a linear or branched $C_1$-$C_{18}$ alkyl group;
$R_3$ represents a linear or branched $C_8$-$C_{18}$ alkyl group, or one of the following groups:

$$H_3C-(CH_2)_m-CH-(CH_2)_n-CH_3$$
$$\phantom{H_3C-(CH_2)_m-}CH_2-$$
$$CH_3-(CH_2)_p-CH_2-$$

wherein m and n are an integer ranging from 0 to 11, extremes included, and m+n is 10 or 11, and p is 12 or 13;
b) a solid compound belonging to the group of sterically hindered phenols having the following formula

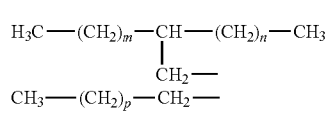

wherein n is an integer ranging from 0 to 10, extremes included.

The stabilising mixture is said to be liquid and it is prepared by heating the components together. An inherent problem associated with this mixture is an insufficient compatibility with aqueous polymer dispersions. The use of such liquid preparation is inherently inefficient in the stabilisation of aqueous polymer dispersions as the antioxidant mixture is not fully compatible with an aqueous polymer dispersion. It is further on disclosed in WO-A-2001/81458 that such mixture may be used in combination with further stabilizers, and 19 different classes of compounds with more than hundred different antioxidants are listed as potential further stabilizers. There is no disclosure whether and if yes which specific combination of stabilizers might be suited to improve the stabilizing effect on rubbers synergistically.

In summary, it can be said that neither a process nor any stabilizing system being toxicologically unproblematic have been described up to now which allow to provide an improved stability to rubbers with regard to Mooney viscosity stability and at the same time colour stability.

It was therefore the object of the present invention to provide unsaturated rubbers having a good storage stability with regard to Mooney viscosity and colour stability, which do not encompass toxicologically and environmentally hazardous compounds and at the same time dispose of unchanged good processing properties, i.e. a good vulcanization profile and advantageous mechanical properties.

SUMMARY OF THE INVENTION

The invention provides in Embodiment 1 a stabilized rubber comprising
(i) at least one compound of formula (I)

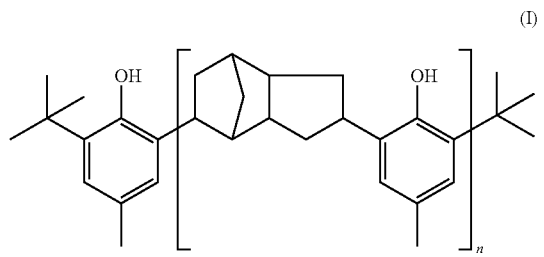

wherein
n is in the range of from 1 to 10,
(ii) at least one compound of general formula (II)

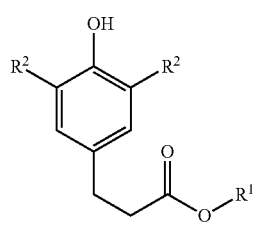

wherein
$R^1$ means hydrogen; straight chain or branched, saturated or one or more times unsaturated, unsubstituted or substituted alkyl; saturated or one or more times unsaturated carbocyclyl or hetercyclyl; aryl; heteroaryl, arylalkyl, heteroarylalkyl, polyoxyalkylene ether, preferably polyoxyethylene ether or polyoxypropylene ether or polyoxyethylene-oxypropylene ether; and $R^2$ are identical or different and mean straight chain or branched $C_1$-$C_6$ alkyl or $C_5$-$C_6$ cycloalkyl; and
(iii) at least one compound of general formula (III)

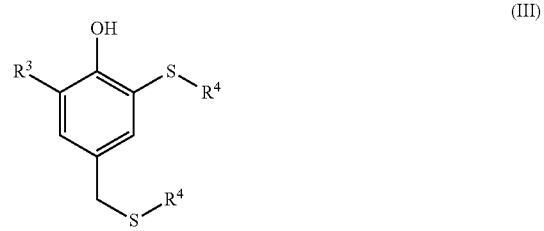

wherein
$R^3$ means straight chain or branched $C_1$-$C_{14}$ alkyl; and
$R^4$ means hydrogen, straight chain or branched, saturated or one or more times unsaturated, unsubstituted or substituted alkyl; saturated or one or more times unsaturated carbocyclyl or hetercyclyl; aryl; heteroaryl, arylalkyl, heteroarylalkyl, alkoxy, aryloxy, heteroaryloxy, alkylthio or arylthio.

In an alternative Embodiment 2 the present invention relates to a stabilized rubber comprising
(i) at least one compound of formula (I)

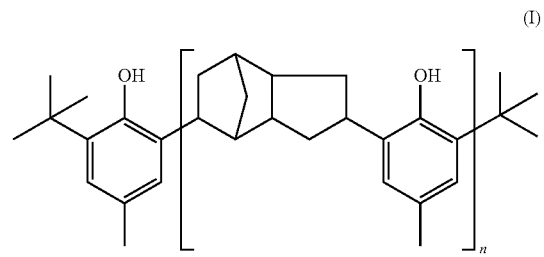

wherein
n is in the range of from 1 to 10;
(ii) at least one compound of general formula (II)

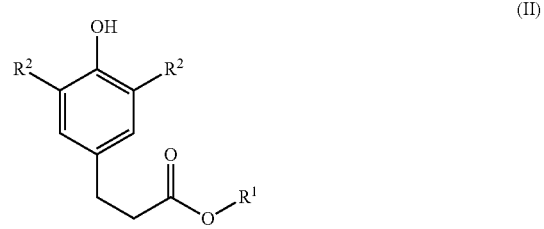

wherein
$R^1$ means hydrogen; straight chain or branched, saturated or one or more times unsaturated, unsubstituted or substituted alkyl; saturated or one or more times unsaturated carbocyclyl or hetercyclyl; aryl; heteroaryl, arylalkyl, heteroarylalkyl, polyoxyalkylene ether, preferably polyoxyethylene ether or polyoxypropylene ether or polyoxyethylene-oxypropylene ether; and
$R^2$ are identical or different and mean straight chain or branched $C_1$-$C_6$ alkyl or $C_5$-$C_6$ cycloalkyl; and (iii) at least one compound of general formula (III)

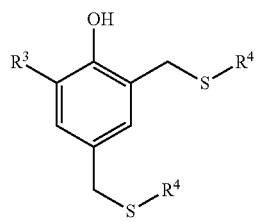

wherein
R³ means straight chain or branched $C_1$-$C_{14}$ alkyl; and
R⁴ are identical or different and mean hydrogen, straight chain or branched, saturated or one or more times unsaturated, unsubstituted or substituted alkyl; saturated or one or more times unsaturated carbocyclyl or hetercyclyl; aryl; heteroaryl, arylalkyl, heteroarylalkyl, alkoxy, aryloxy, heteroaryloxy, alkylthio or arylthio.

The present invention further relates to a process for producing the stabilized rubbers according to the invention by bringing the components (i), (ii) and (iii) into contact with the rubber. In alternative embodiments thereof such incorporation may be achieved (I) during the preparation of the rubber, including the polymerisation and the work-up of the rubber, the latter comprising the coagulation and isolation, or (2) in one or more further chemical conversion steps subsequently to the preparation of the rubber like e.g. a metathesis reaction, a hydrogenation reaction or a polymer analoguous reaction like grafting, and/or (3) during the preparation of vulcanizable mixtures based on the nitrile rubber or the nitrile rubber after being subjected to one or more further chemical conversion, i.e. before cross-linking. The present invention further relates to stabilized rubbers obtainable by any of the preceding processes.

The present invention further relates to a vulcanizable mixture containing at least one stabilized rubber and at least one cross-linking agent, a process for the preparation thereof, a process for preparing vulcanizates of the vulcanizable mixture and eventually the vulcanizates obtained therefrom.

DETAILED DESCRIPTION OF THE INVENTION

Unless otherwise indicated explicitly the detailed description and all definitions given above and in the following shall apply to Embodiment 1 as well as to Embodiment 2 of the present invention.

For the purposes of the present patent application and invention, all the definitions of moities, parameters or explanations given above or below in general terms or in preferred ranges can be combined with one another in any way, i.e. including combinations of the respective ranges and preferred ranges.

The term "substituted" used for the purposes of the present patent application means that a hydrogen atom on an indicated radical or atom has been replaced by one of the groups indicated in each case, with the proviso that the valency of the atom indicated is not exceeded and the substitution leads to a stable compound.
Rubbers:

In one embodiment of the present invention the rubbers to be stabilized are unsaturated, or partially or fully hydrogenated.

Examples of any rubbers which can be stabilized according to the present invention are:
NBR nitrile rubbers as defined in more detail below.
HNBR partially or fully hydrogenated nitrile rubbers as defined in more detail below,
SBR styrene-butadiene copolymers, including carboxylated derivatives thereof,
CR polychloroprene,
BR polybutadiene,
IIR isobutylene-isoprene copolymers, preferably with isoprene contents of 0.5 to 10% by weight,
BIIR brominated isobutylene-isoprene copolymers, preferably with bromine contents of 0.1 to 10% by weight,
CIIR chlorinated isobutylene-isoprene copolymers, preferably with chlorine contents of 0.1 to 10% by weight,
ABR butadiene-$C_{14}$-alkyl acrylate copolymers,
NIR acrylonitrile isoprene rubber
SIR styrene isoprene rubber
IR polyisoprene,
NR natural rubber
ENR epoxidized natural rubber or
mixtures thereof.

In a preferred embodiment the rubbers to be stabilized contain C=C double bonds.
Nitrile Rubber:

In a preferred embodiment the invention is directed to a nitrile rubber being stabilized having repeating units derived from of at least one α,β-unsaturated nitrile, at least one conjugated diene and none, one or more further copolymerizable monomers.

As α,β-unsaturated nitrile, it is possible to use any known α,β-unsaturated nitrile, preferably a ($C_3$-$C_5$) α,β-unsaturated nitrile such as acrylonitrile, methacrylonitrile, ethacrylonitrile or mixtures thereof. Particular preference is given to acrylonitrile.

The conjugated diene can be of any nature. Preference is given to using ($C_4$-$C_6$) conjugated dienes.

Particular preference is given to 1,3-butadiene, isoprene, 2,3-dimethylbutadiene, piperylene or mixtures thereof. Very particular preference is given to 1,3-butadiene and isoprene or mixtures thereof. Especial preference is given to 1,3-butadiene.

A particularly preferred nitrile rubber used in the process of this invention is thus a copolymer having repeating units derived from acrylonitrile and 1,3-butadiene.

Apart from the conjugated diene and the α,β-unsaturated nitrile, the hydrogenated nitrile rubber may comprise repeating units of one or more further copolymerizable monomers known in the art, e.g. α,β-unsaturated (preferably mono-unsaturated) monocarboxylic acids, their esters and amides, α,β-unsaturated (preferably mono-unsaturated) dicarboxylic acids, their mono- or diesters, as well as the respective anhydrides or amides of said α,β-unsaturated dicarboxylic acids.

As α,β-unsaturated monocarboxylic acids acrylic acid and methacrylic acid are preferably used.

Esters of α,β-unsaturated monocarboxylic acids may also be used, in particular alkyl esters, alkoxyalkyl esters, aryl esters, cycloalkylesters, cyanoalkyl esters, hydroxyalkyl esters, and fluoroalkyl esters.

As alkyl esters $C_1$-$C_{18}$ alkyl esters of the α,β-unsaturated monocarboxylic acids are preferably used, more preferably $C_1$-$C_{18}$ alkyl esters of acrylic acid or methacrylic acid, such as methylacrylate, ethylacrylate, propylacrylate, n-butylacrylate, tert.-butylacrylate, 2-ethyl-hexylacrylate, n-dodecylacrylate, methylmethacrylate, ethylmethacrylate, propylmethacrylate, n-butylmethacrylate, tert.-butylmethacrylate and 2-ethylhexyl-methacrylate.

As alkoxyalkyl esters $C_2$-$C_{18}$ alkoxyalkyl esters of α,β-unsaturated monocarboxylic acids are preferably used, more preferably alkoxyalkylester of acrylic acid or methacrylic acid such as methoxy methyl(meth)acrylate, methoxy ethyl (meth)acrylate, ethoxyethyl(meth)acrylate and methoxyethyl(meth)acrylate.

It is also possible to use aryl esters, preferably $C_6$-$C_{14}$-aryl-, more preferably $C_6$-$C_{10}$-aryl esters and most preferably the aforementioned aryl esters of acrylates and methacrylates.

In another embodiment cycloalkyl esters, preferably $C_5$-$C_{12}$-, more preferably $C_6$-$C_{12}$-cyclo-alkyl and most preferably the aforementioned cycloalkyl acrylates and methacrylates are used.

It is also possible to use cyanoalkyl esters, in particular cyanoalkyl acrylates or cyanoalkyl methacrylates, with 2 to 12 C atoms in the cyanoalkyl group, preferably α-cyanoethyl acrylate, β-cyanoethyl acrylate or cyanobutyl methacrylate.

In another embodiment hydroxyalkyl esters are used, in particular hydroxyalkyl acrylates and hydroxyalkyl methacrylates with 1 to 12 C-atoms in the hydroxylalkyl group, preferably 2-hydroxyethyl acrylate, 2-hydroxyethyl methacrylate or 3-hydroxypropyl acrylate.

It is also possible to use fluorobenzyl esters, in particular fluorobenzyl acrylates or fluorobenzyl methacrylates, preferably trifluoroethyl acrylate and tetrafluoropropyl methacrylate. Substituted amino group containing acrylates and methacrylates may also be used like dimethylaminomethyl acrylate and diethylaminoethylacrylate.

Various other esters of the α,β-unsaturated carboxylic acids may also be used, like e.g. poly-ethyleneglycol(meth)acrylate, polypropyleneglycole(meth)acrylate, glycidyl (meth)acrylate, epoxy(meth)acrylate, N-(2-hydroxyethyl) acrylamide. N-(2-hydroxymethyl)acrylamide or urethane (meth)acrylate.

It is also possible to use mixture of all aforementioned esters of a, unsaturated carboxylic acids.

Further on α,β-unsaturated dicarboxylic acids may be used, preferably maleic acid, fumaric acid, crotonic acid, itaconic acid, citraconic acid and mesaconic acid.

In another embodiment anhydrides of α,β-unsaturated dicarboxylic acids are used, preferably maleic anhydride, itaconic anhydride, itaconic anhydride, citraconic anhydride and mesaconic anhydride.

In a further embodiment mono- or diesters of α,β-unsaturated dicarboxylic acids can be used. Suitable alkyl esters are e.g. $C_1$-$C_{10}$-alkyl, preferably ethyl-, n-propyl-, iso-propyl, n-butyl-, tert.-butyl, n-pentyl-oder n-hexyl mono- or diesters. Suitable alkoxyalkyl esters are e.g. $C_2$-$C_{12}$ alkoxyalkyl-, preferably $C_3$-$C_8$-alkoxyalkyl mono- or diesters. Suitable hydroxyalkyl esters are e.g. $C_1$-$C_{12}$ hydroxyalkyl-, preferably $C_2$-$C_8$-hydroxyalkyl mono- or diesters. Suitable cycloalkyl esters are e.g. $C_5$-$C_{12}$-cycloalkyl-, preferably $C_6$-$C_{12}$-cycloalkyl mono- or diesters. Suitable alkylcycloalkyl esters are e.g. $C_6$-$C_{12}$-alkylcycloalkyl-, preferably $C_7$-$C_{10}$-alkylcycloalkyl mono- or diesters. Suitable aryl esters are e.g. $C_6$-$C_{14}$-aryl, preferably $C_6$-$C_{10}$-aryl mono- or diesters.

Explicit examples of the α,β-ethylenically unsaturated dicarboxylic acid monoester monomers include maleic acid monoalkyl esters, preferably monomethyl maleate, monoethyl maleate, monopropyl maleate, and mono n-butyl maleate;

maleic acid monocycloalkyl esters, preferably monocyclopentyl maleate, monocyclohexyl maleate, and monocycloheptyl maleate;

maleic acid monoalkylcycloalkyl esters, preferably monomethylcyclopentyl maleate, and monoethylcyclohexyl maleate;

maleic acid monoaryl ester, preferably monophenyl maleate;

maleic acid mono benzyl ester, preferably monobenzyl maleate;

fumaric acid monoalkyl esters, preferably monomethyl fumarate, monoethyl fumarate, monopropyl fumarate, and mono n-butyl fumarate;

fumaric acid monocycloalkyl esters, preferably monocyclopentyl fumarate, monocyclohexyl fumarate, and monocycloheptyl fumarate;

fumaric acid monoalkylcycloalkyl esters, preferably monomethylcyclopentyl fumarate, and monoethylcyclohexyl fumarate;

fumaric acid monoaryl ester, preferably monophenyl fumarate;

fumaric acid mono benzyl ester, preferably monobenzyl fumarate;

citraconic acid monoalkyl esters, preferably monomethyl citraconate, monoethyl citraconate, monopropyl citraconate, and mono n-butyl citraconate;

citraconic acid monocycloalkyl esters, preferably monocyclopentyl citraconate, monocyclohexyl citraconate, and monocycloheptyl citraconate;

citraconic acid monoalkylcycloalkyl esters, preferably monomethylcyclopentyl citraconate, and monoethylcyclohexyl citraconate;

citraconic acid mono aryl ester, preferably monophenyl citraconate;

citraconic acid mono benzyl ester, preferably monobenzyl citraconate;

itaconic acid mono alkyl esters, preferably monomethyl itaconate, monoethyl itaconate, monopropyl itaconate, and mono n-butyl itaconate;

itaconic acid monocycloalkyl esters, preferably monocyclopentyl itaconate, monocyclohexyl itaconate, and monocycloheptyl itaconate;

itaconic acid monoalkylcycloalkyl esters, preferably monomethylcyclopentyl itaconate, and monoethylcyclohexyl itaconate;

itaconic acid mono aryl ester, preferably monophenyl itaconate;

itaconic acid mono benzyl ester, preferably monobenzyl itaconate.

As α,β-ethylenically unsaturated dicarboxylic acid diester monomers the analogous diesters based on the above explicitely mentioned mono ester monomers may be used, wherein, however, the two organic groups linked to the C=O group via the oxygen atom may be identical or different.

As further termonomers vinyl aromatic monomers like styrol, α-methylstyrol and vinylpyridine, as well as non-conjugated dienes like 4-cyanocyclohexene and 4-vinylcyclohexene, as well as alkines like 1- or 2-butine may be used.

Particularly preferred are termonomers or their respective di- or triester chosen from the below depicted formulae:

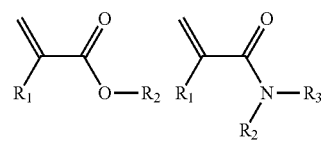

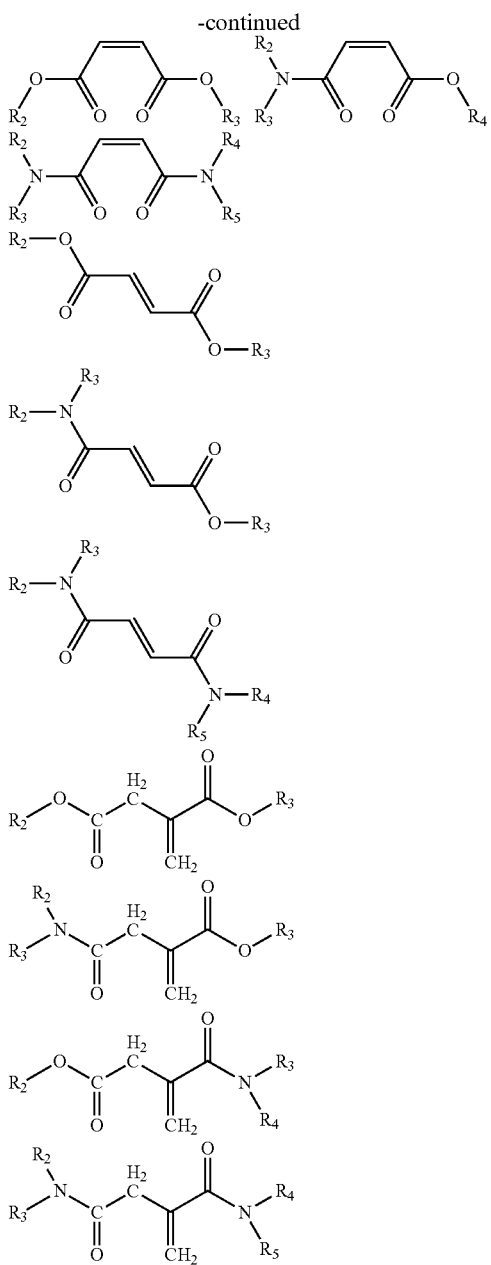

where
R¹ is hydrogen or methyl group, and
R², R³, R⁴, R⁵ are identical or different and may represent H, $C_1$-$C_{12}$ alkyl, cycloalkyl, alkoxyalkyl, hydroxyalkyl, expoxyalkyl, aryl, heteroaryl.

In one embodiment of the present invention the rubber is NBR, preferably having repeating units derived from of at least one α,β-unsaturated nitrile, more preferably acrylonitrile, at least one conjugated diene, more preferably butadiene, and none, one or more further copolymerizable monomers, more preferably none or one copolymerizable monomer selected from acrylic acid and methacrylic acid; or SBR.

The proportions of conjugated diene and α,β-unsaturated nitrile in the NBR to be used can vary within wide ranges. The proportion of the conjugated diene or the sum of conjugated dienes is usually in the range from 20 to 95% by weight, preferably in the range from 40 to 90% by weight, more preferably 50 to 85% by weight, based on the total polymer. The proportion of α,β-unsaturated nitrile or the sum of α,β-unsaturated nitriles is usually from 5 to 80% by weight, preferably from 10 to 60, more preferably 15 to 50% by weight, based on the total polymer. The proportions of the monomers in each case add up to 100% by weight. The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or the α,β-unsaturated nitrile or nitriles are replaced by proportions of the additional monomers, with the proportions of all monomers in each case adding up to 100% by weight.

The preparation of the nitrile rubbers by polymerization of the abovementioned monomers is adequately known to those skilled in the art and is comprehensively described in the literature. Nitrile rubbers which can be used for the purposes of the invention are also commercially available, e.g. as products from the product range of the Perbunan® and Krynac® grades of Lanxess Deutschland GmbH.

The nitrogen content used to determine the acrylonitrile content ("ACN content") of the nitrile rubbers is determined by the Kjeldahl method in accordance with DIN 53 625. Owing to the content of polar comonomers, the nitrile rubbers are usually soluble in methyl ethyl ketone to an extent of ≥85% by weight at 20° C.

The nitrile rubbers have Mooney values (ML (1+4 @100° C.)) of from 10 to 150, preferably from 20 to 140, Mooney units, particularly preferably from 25 to 120 Mooney units. This is the value MV1 in the context of formula (I) as explained below.

The glass transition temperatures of the nitrile rubbers are in the range from −80° C. to +20° C., preferably in the range from −70° C. to +10° C. and most preferably in the range from −60° C. to +5° C.

Preference is given to nitrile rubbers according to the invention which comprise repeating units of acrylonitrile, 1,3-butadiene and none, one or more further copolymerizable monomers. Preference is likewise given to nitrile rubbers having repeating units of acrylonitrile, 1,3-butadiene and one or more α,β-unsaturated monocarboxylic or dicarboxylic acids, their esters or amides, and in particular repeating units of an alkylester of an α,β-unsaturated carboxylic acid, very particularly preferably of methyl (meth) acrylate, ethyl (meth)acrylate, propyl (meth)acrylate, n-butyl (meth)acrylate, t-butyl (meth)acrylate, hexyl (meth) acrylate, 2-ethylhexyl (meth)acrylate, octyl (meth)acrylate, lauryl (meth)acrylate or fumaric acid.

SBR:

SBR represent styrene-butadiene copolymers, including carboxylated derivatives thereof. SBR therefore encompasses repeating units derived from styrene and butadiene. The styrene content lies typically in the range of from 0 to 100% by weight, preferably from 10 to 60% by weight. SBR may be prepared by two different processes, namely by polymerization in emulsion ("E-SBR") or in a solvent ("S-SBR"). Emulsion polymerisation is a radical polymerization while solution polymerization is an anionic polymerization. Carboxylated derivatives of SBR (sometimes abbreviated as XSBR) can be obtained by either copolymerizing at least one carboxy group containing unsaturated monomer with butadiene and styrene or by grafting the styrene-butadiene copolymer with at least one carboxy group monomer, such as acrylic acid, methacrylic acid, acrylamide, methacrylamide, N-methoxymethylmethacrylamide, N-acetoxymethylmethacrylamide, acrylonitrile, dimethylacrylamide, hydroxyethyl acrylate, hydroxypropyl acrylate, hydroxybutyl acrylate, hydroxyethyl methacrylate, hydroxypropyl methacrylate, hydroxybutyl methacrylate, ethylene glycol dimethacrylate, butanediol dimethacrylate, trimethylolpropane trimethacrylate, or pentaerythritol tetramethacrylate. The content of such copolymerized/grafted carboxy group containing monomer(s) may vary in the range of from 0.1 to 25% by weight based on the total polymer.

In one embodiment of Embodiment 1 the invention provides a stabilized rubber, preferably a nitrile rubber comprising repeating units derived from at least one α,β-unsaturated nitrile, at least one conjugated diene and none, one or more further copolymerizable monomers, or a styrene-butadiene copolymer, which further contains (i) at least one, preferably one, compound of formula (I)
(ii) at least one, preferably one, compound of general formula (II)
   wherein
   $R^1$ means hydrogen; straight chain or branched, saturated or one or more times unsaturated, unsubstituted or substituted $C_1$-$C_{30}$ alkyl, more preferably straight chain or branched $C_{12}$-$C_{24}$ alkyl, most preferably straight chain $C_{14}$-$C_{18}$ alkyl; saturated or one or more times unsaturated $C_3$-$C_{10}$ carbocyclyl, preferably $C_3$ to $C_6$ cycloalkyl, or $C_3$-$C_{10}$ heterocyclyl; $C_6$-$C_{24}$ aryl, preferably $C_6$-$C_{12}$ aryl; $C_5$-$C_{23}$ heteroaryl, preferably $C_5$-$C_{11}$ heteroaryl, $C_7$-$C_{30}$ arylalkyl, preferably $C_7$-$C_{25}$ arylalkyl, $C_6$-$C_{29}$ heteroarylalkyl, preferably $C_6$-$C_{25}$ heteroarylalkyl, polyoxyalkylene ether, preferably polyoxyethylene ether or polyoxypropylene ether or polyoxyethylene-oxypropylene ether
   $R^2$ are identical or different and mean straight chain or branched $C_1$-$C_4$ alkyl or $C_6$ cycloalkyl; and
(iii) at least one, preferably one, compound of general formula (III)
   wherein
   $R^3$ means straight chain or branched $C_6$-$C_{12}$ alkyl, preferably straight chain or branched $C_8$-$C_{10}$ alkyl; and
   $R^4$ means hydrogen; straight chain or branched, saturated or one or more times unsaturated, unsubstituted or substituted $C_1$-$C_{30}$ alkyl; saturated or one or more times unsaturated $C_3$-$C_{10}$ carbocyclyl or $C_3$-$C_{10}$ heterocyclyl; $C_6$-$C_{24}$ aryl; $C_5$-$C_{23}$ heteroaryl, $C_7$-$C_{30}$ arylalkyl, $C_6$-$C_{29}$ heteroarylalkyl, $C_1$-$C_{24}$ alkoxy, $C_6$-$C_{24}$ aryloxy, $C_5$-$C_{23}$ heteroaryloxy, $C_1$-$C_{24}$ alkylthio or $C_6$-$C_{24}$ arylthio, preferably straight chain or branched, saturated, one or more times unsaturated, unsubstituted or substituted $C_1$-$C_{30}$ alkyl, more preferably straight chain or branched, saturated, one or more times unsaturated $C_3$ to $C_{20}$ alkyl wherein said alkyl is either unsubstituted or substituted with one or more substituents selected from the group consisting of amino, amido, alkoxy, aryloxy, thio, alkylthio, arylthio, carbonyl, carboxy, oxycarbonyl, oxo, epoxy, or sulfoxyl.

In one embodiment of Embodiment 2 the invention provides a stabilized rubber, preferably a nitrile rubber, comprising repeating units derived from at least one α,β-unsaturated nitrile, more preferably acrylonitrile, at least one conjugated diene, more preferably 1,3-butadiene and none, one or more further copolymerizable monomers, or a styrene-butadiene copolymer, which stabilized rubber further contains (i) at least one, preferably one, compound of formula (I)

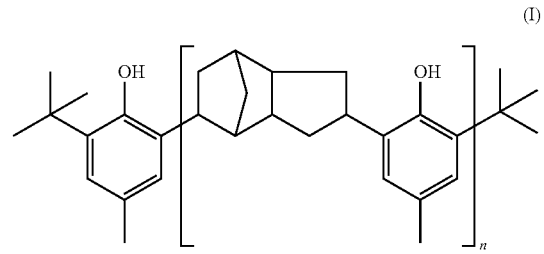

wherein
n is in the range of from 1 to 10;
(ii) at least one, preferably one compound of general formula (II)

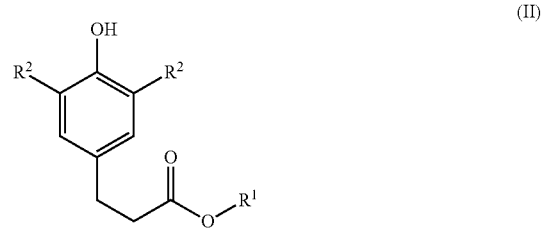

wherein
$R^1$ means hydrogen; straight chain or branched, saturated or one or more times unsaturated, unsubstituted or substituted $C_1$-$C_{30}$ alkyl, more preferably straight chain or branched $C_{12}$-$C_{24}$ alkyl, most preferably straight chain $C_{14}$-$C_{18}$ alkyl; saturated or one or more times unsaturated $C_3$-$C_{10}$ carbocyclyl, preferably $C_3$-$C_6$ cycloalkyl; $C_3$-$C_{10}$ heterocyclyl, preferably $C_3$-$C_6$ heterocyclyl; $C_6$-$C_{24}$ aryl, preferably $C_6$-$C_{12}$ aryl; $C_5$-$C_{23}$ heteroaryl, preferably $C_5$-$C_{11}$ heteroaryl; $C_7$-$C_{30}$ arylalkyl, preferably $C_7$-$C_{25}$ arylalkyl; $C_6$-$C_{29}$ heteroarylalkyl, preferably $C_6$-$C_{25}$ heteroarylalkyl; polyoxyalkylene ether, preferably polyoxyethylene ether or polyoxypropylene ether or polyoxyethylene-oxypropylene ether
$R^2$ are identical or different, preferably identical, and mean straight chain or branched $C_1$-$C_4$ alkyl, preferably methyl, ethyl, n-propyl, iso-propyl, n-butyl, iso-butyl, tert.-butyl, or $C_6$ cycloalkyl; and
(iii) at least one, preferably one compound of general formula (III)

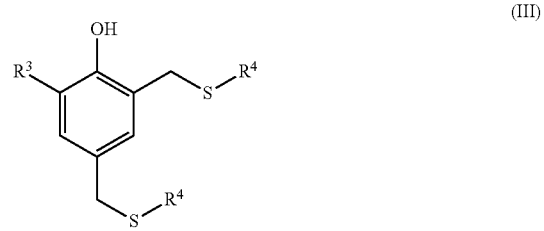

wherein
$R^3$ means straight chain or branched $C_1$-$C_{14}$ alkyl; preferably straight chain or branched $C_1$-$C_{10}$ alkyl, and
$R^4$ are identical or different, preferably identical, and mean hydrogen; straight chain or branched, saturated or one or more times unsaturated, unsubstituted or substituted $C_1$-$C_{30}$ alkyl; saturated or one or more times unsaturated $C_3$-$C_{10}$ carbocyclyl or $C_3$-$C_{10}$ heterocyclyl; $C_6$-$C_{24}$ aryl; $C_5$-$C_{23}$ heteroaryl, $C_7$-$C_{30}$ arylalkyl, $C_6$-$C_{29}$ heteroarylalkyl, $C_1$-$C_{24}$ alkoxy, $C_6$-$C_{24}$ aryloxy, $C_5$-$C_{23}$ heteroaryloxy, $C_1$-$C_{24}$ alkylthio or $C_6$-$C_{24}$ arylthio, preferably straight chain or branched, saturated, one or more times unsaturated, unsubstituted or substituted $C_1$-$C_{25}$ alkyl, more preferably straight chain or branched, saturated, one or more times unsaturated $C_1$ to $C_{20}$ alkyl wherein said alkyl is either unsubstituted or substituted with one or more substituents selected from the group consisting of amino, amido, alkoxy, aryloxy, thio, alkylthio, arylthio, carbonyl, carboxy, oxycarbonyl, oxo, epoxy, or sulfoxyl.

In a further embodiment of Embodiment 2 the invention provides a stabilized rubber, preferably a nitrile rubber, comprising repeating units derived from at least one α,β-unsaturated nitrile, more preferably acrylonitrile, at least one conjugated diene, more preferably 1,3-butadiene and none, one or more further copolymerizable monomers, or a styrene-butadiene copolymer, which stabilized rubber further contains (i) at least one, preferably one compound of formula (I)
(ii) at least one, preferably one compound of general formula (II) wherein
$R^1$ means straight chain or branched $C_{15}$-$C_{18}$ alkyl;
$R^2$ are identical and mean straight chain or branched $C_1$-$C_4$ alkyl, more preferably methyl, ethyl, n-propyl, iso-propyl, n-butyl, iso-butyl, tert.-butyl, or $C_6$ cycloalkyl; and
(iii) at least one, preferably one compound of general formula (III) wherein
$R^3$ means straight chain or branched $C_1$-$C_4$ alkyl; and
$R^4$ are identical and mean straight chain or branched, saturated or one or more times unsaturated, unsubstituted or substituted $C_6$-$C_{14}$ alkyl In one embodiment of the present invention the carbon atoms in the compound of general formula (I), whether in the phenyl ring or in the substituents already attached to the phenyl ring or in the repeating units derived from cyclopentadiene monomer can be substituted by one or more substituents selected from the group consisting of straight chain or branched, saturated or one or more times unsaturated, unsubstituted or substituted $C_1$-$C_{30}$ alkyl; saturated or one or more times unsaturated $C_3$-$C_{10}$ carbocyclyl or $C_3$-$C_{10}$ heterocyclyl; $C_6$-$C_{24}$ aryl; $C_5$-$C_{23}$ heteroaryl, $C_7$-$C_{30}$ arylalkyl, $C_6$-$C_{29}$ heteroarylalkyl, $C_1$-$C_{24}$ alkoxy, $C_6$-$C_{24}$ aryloxy, $C_5$-$C_{23}$ heteroaryloxy, $C_1$-$C_{30}$ alkoxycarbonyl, F, Cl, Br, I, Hydroxy, hydroxy-imino, carbamoyl, phosphonato, phosphinato, alkylthio, arylthio, sulfanyl, thiocarboxy, sulfinyl, sulfono, sulfino, sulfeno, sulfonic acid, sulfamoyl, silyl, silyloxy, nitril, carbonyl, carboxy, oxycarbonyl, oxysulfonyl, oxo, thioxo, borate, selenate, epoxy, cyanate, thiocyanate, isocyanate, thioisocyanate and isocyanide.

In one embodiment of the present invention the stabilized rubber comprises one compound of general formula (I), one compound of general formula (II) and one compound of general formula (III). In the alternative two or more compounds may be selected from one or more of the groups (i), (ii) and (iii) and be present in the stabilized rubber.

Different compounds falling under the definitions of formulae (I)-(II) for the three components to be used to stabilize the rubber are commercially available or may be prepared according to procedures known in the art.

Explicit examples of the three components in the stabilized rubber are:

with regard to component (i): Component (i) represents a poly(dicyclopentadiene-co-p-cresol) and is available as Wingstay® L (e.g. from Omnova) or Ralox® LC (e.g. from Raschig) which has formula (I) as shown above and the CAS no. 68610-51-5.

with regard to component (ii): Component (ii) belongs to the class of sterically hindered phenols and an explicit example is available as Irganox® 1076 (available from BASF S.E. having the CAS no. 2082-79-3) which has formula (II) with $R^1$ being straight chain $C_{18}$-alkyl and both $R^2$ being tert.butyl;

with regard to component (iii): Component (iii) belongs to the class of alkyl thio methyl phenol antioxidants and an explicit example is available as Irganox® 1520 (available from BASF S.E. having the CAS no. 110553-27-0) which has formula (III) with both $R^4$ being n-octyl and $R^3$ being methyl.

If considered helpful other antioxidants or anti-ageing compounds may be added to the rubber for further stabilization. Such additional antioxidants may include alkylated monophenols, hydroquinones and alkylated hydroquinones, tocopherols, hydroxylated thiodiphenyl ethers, alkylidene-bisphenols; benzyl compounds containing O, N or S, hydroxybenzylated malonates, aromatic hydroxybenzyl compounds, triazine compounds, benzylphosphonates, acylaminophenols, esters of β-(5-t-butyl-4-hydroxy-3-methylphenyl)propionic acid with monohydric or polyhydric alcohols; esters of β-(3,5-dicyclohexyl-4-hydroxyphenyl) propionic acid with monohydric or polyhydric alcohols; esters of (3,5-di-t-butyl-4-hydroxyphenyl) acetic acid with monohydric or polyhydric alcohols; amides of β-(3,5-di-1-butyl-4-hydroxyphenyl)propionic acid, ascorbic acid (vitamin C), and aminic antioxidants In another embodiment the stabilized rubber may additionally contain
(iv) at least one phosphite antioxidant In a preferred embodiment the stabilized rubber additionally contains a phosphite antioxidant selected from the group consisting of tris (nonylphenyl) phosphite (also abbreviated as TNPP), tris(2,4-di-t-butyl phenyl) phosphite, other alkylaryl phosphites, and mixtures of the aforementioned. In the alternative a phosphite sold under the trade marke Weston 705 (Addivant USA LLC) can be used.

In an alternative but equally preferred embodiment the stabilized rubber according to the present invention is characterized in that the stabilized rubber does not contain any further antioxidants other than compounds (i), (ii) and (iii).

In an alternative but equally preferred embodiment the stabilized rubber according to the present invention is characterized in that the stabilized rubber does not contain any further antioxidants other than compounds (i), (ii) and (iii) and a phospite antixoxidant.

Amount and Ratio of Stabilzer Components:

Typically the total amount of the three stabilizer components (i), (ii) and (iii) is in the range of from 0.01 to 10.0% by weight, preferably 0.03 to 7.5% by weight, and more preferably with 0.05 to 5.0% by weight based on 100 parts by weight of the rubber, preferably the nitrile rubber or styrene butadiene rubber.

The ratio in which the at least three stabilizer components (i), (ii) and (iii) may be used can be chosen over a wide range. Preferably the weight ratio of component (i):component (ii):component (iii) is in the range of from (0.1-10):1:(0.1-10), preferably (0.5-2):1:(0.5-2) and more preferably (1-2):1:(1-2).

Most preferably the ratio of the stabilizer components (i), (ii) and (iii) is either 1:1:1 or 2:1:2. This shall include a deviation from the exact ratios of 10% plus/minus for each component.

In case other stabilizers are used in addition to the three ones according to general formulae (I)-(III) to stabilize the rubber such other stabilizers are used with up to 5% by weight, preferably up to 3.75% by weight and more preferably up to 2.5% by weight based on 100 parts by weight of the rubber, preferably the nitrile rubber or styrene butadiene rubber. However, it needs to be taken into account that the total amount of all stabilizers present should not reach too high values. Therefore the person skilled in the art may easily determine whether it is reasonable to reduce the amount of stabilizers according to general formulae (I)-(III) in case additional different stabilizers are used.

Advantages of the Stabilized Rubbers:

The stabilized rubbers of the invention and in particular the stabilized nitrile rubbers or styrene butadiene rubbers surprisingly show the desired very good storage stability and colour stability while having at the same time have a positive processing behaviour and unchanged positive mechanical and dynamical properties.

For the purposes of the present invention, the storage stability of a rubber is given if the Mooney viscosity is as stable as possible over a prolonged period of time, especially at relatively high temperatures, too.

The storage stability is usually determined by storing the unvulcanized rubber for a defined period of time at elevated temperature (also referred to as hot air storage) and determining the difference between the Mooney viscosities before and after this storage at elevated temperature. Since the Mooney viscosity of rubber usually increases during hot air storage, the storage stability is characterized by the difference of Mooney viscosity after storage minus Mooney viscosity before storage. This will be shown on the example of stabilized nitrile rubbers in the following, however, may be analoguously transferred to other rubber types, too.

With regard to nitrile rubbers the short term storage stability "SS (ST)" is given in % via the formula $$SS(ST) = \frac{MV2 - MV1}{MV1}$$

wherein

MV1 is the Mooney viscosity of a nitrite rubber before storage and

MV2 is the Mooney viscosity of the same nitrile rubber after storage at 100° C. for 48 hours.

Similarly the long term storage stability "SS (LT)" is given in % via the following formula $$SS(LT) = \frac{MV3 - MV1}{MV1}$$

wherein

MV1 is the Mooney viscosity of a nitrile rubber before storage and

MV3 is the Mooney viscosity of the same nitrile rubber after storage at 70° C. for 7 days.

The values for the Mooney viscosity (ML1+4@ 100° C.) are in each case determined at 100° C. by means of a shear disc viscometer in accordance with DIN 53523/3 or ASTM D 1646. Both storage procedures whether at 100° C. for 48 hours or at 70° C. for 7 days are performed in a convection drying oven in which the oxygen content is unchanged compared to normal air.

A change in Mooney viscosity (ML1+4@100° C.) of one (I) Mooney unit can be considered as coincidental effect or caused by error of measurement.

A rubber is considered as having sufficient storage stability if the rubber does not only show a small change of the Mooney viscosity on short term ageing, but also on long-term ageing calculated as ageing index "AI" given in % pursuant to the following formula $$AI = [SS(ST) + SS(LT)]$$

The absolute values of ageing indices AI obtained for nitrile rubbers may only be directly compared with each other if the nitrite rubbers have been coagulated via the same coagulation method (i.e. either with the same coagulation salt or acid) and contain repeating units of the same monomers.

In case ageing indices AI of nitrile rubbers shall be compared which have been coagulated via different coagulation methods (i.e. either with the same coagulation salt or acid) or which do not contain repeating units of the same monomers it is necessary to multiply the ageing index with a correction factor F to obtain a corrected ageing index AI (corr.).

The corrected ageing index AI(corr.) can be determined according to the following formula $$AI(corr.) = F \cdot AI$$

wherein

F is a correction factor which has the value 1, if a nitrile rubber comprising repeating units of at least one conjugated diene and of at least one α,β unsaturated nitrile has been coagulated with a calcium salt or with an acid, or the value 0.5 if a nitrile rubber comprising repeating units of at least one conjugated diene and of at least one α,β unsaturated nitrile has been coagulated with another salt than a calcium salt, in particular with an aluminum salt, or the value 0.04 if a nitrile rubber comprising repeating units of at least one conjugated diene, of at least one α,β unsaturated nitrile and of at least one termonomer, preferably an unsaturated carboxylic acid.

On the basis of the above formula a nitrile rubber shall be considered as sufficiently storage stable if the corrected ageing index AI(corr.) is at maximum 14%.

The high storage stability has positive effects even during drying of the nitrile rubber, since some unintended ageing of the rubber otherwise takes place during this drying. The high storage stability aids the setting of a prescribed target Mooney viscosity. The amount of out-of-specification nitrile rubber is reduced as a result. Furthermore, the high storage stability results in a reduction in complaints due to a change in the Mooney viscosity during long storage or transport times. The rubbers of the invention are suitable for the reproducible production of vulcanizable mixtures. The mouldings obtained therefrom by vulcanization thus also have a reproducible mechanical and physical property profile.

Preparation of the Stabilized Rubbers:

The present invention further relates to a process for producing the stabilized rubbers according to the invention by bringing the components (i), (ii), (iii) and optionally (iv) into contact with the rubber.

Such incorporation may be achieved in various manners
(1) during the preparation of the rubber, including the polymerisation and the work-up of the rubber, the latter comprising the coagulation and isolation,
(2) in one or more further chemical conversion steps subsequently to the preparation of the rubber like e.g. a metathesis reaction, a hydrogenation reaction or a polymer analoguous reaction like grafting, and/or
(3) during the preparation of vulcanizable mixtures based on the nitrile rubber or the nitrile rubber after being subjected to one or more further chemical conversion, i.e. before cross-linking.

The addition of the components in any of the aforementioned steps may be realized in different ways:

Each component (i), (ii) and (iii) (and optionally (iv)) can be added separately or in the alternative all different types of mixtures of the mandatory three components can be prepared and added. Typically the three components, whether added singly or in any type of combination, are used as a dispersion or emulsion.

If considered helpful, emulsifying agents may be used for preparing dispersions or emulsions. Suitable emulsifying agents are e.g. such which are thermally stable up to a range of 200-350° C. Suitable emulsifying agents are sodium dodecyl benzene sulfonate or sodium lauryl sulfate, which are preferably used in amounts of 5 to 25% by weight of the stabilizer containing emulsion, depending on the specific properties of the surfactant. The suited amount may be easily determined by a person skilled in the art.

The general processes as described in EP 0 488 550A1 (see e.g. Step 2A on page 7, lines 36 to 49) and EP-A-0 439 427 can be used in analogy to prepare the dispersion or emulsion.

In an alternative embodiment the stabilizing system comprising all three components (i), (ii) and (iii) is prepared beforehand as an aqeous dispersion and is added to the rubber.

In industrial practice it is typically desirable to use aqueous dispersions of the stabilizing system comprising all three components (i), (ii) and (iii) in order to maximise compatibility and efficiency of incorporation. A dispersion may be defined as a heterogeneous mixture of organic material suspended in water. In order to provide these, further ingredients may be required and comprise one or more of: water, surfactants, thickening agents, preservatives and adjuvants such as antifoams.

Surfactants may be anionic, non-ionic or cationic in nature. A preferred surfactant may comprise a mixture of a fatty acid, for example oleic acid and alkali, for example aqueous potassium hydroxide.

A preferred thickening agent may be a hydrocolloid, preferably xanthan gum. This is preferred in order to ensure long term stability during storage and transportation.

Alternatively a solution of such mixtures in water or organic solvent may be employed.

An aqueous dispersions of the stabilizing system to be used in the present invention may be manufactured by heating and mixing the melted ingredients. A surfactant may be added. A suitable surfactant may comprise a mixture of long chain aliphatic acid, for example, oleic acid and alkali, for example, aqueous potassium hydroxide. The resultant mixture may be stirred with hot water and a hydrocolloid, for example xanthan gum to form a suspension which may be cooled. Any further ingredients, for example a biocide may be added before packaging and storage or distribution.

If further different stabilizing agents shall be used they are also typically incorporated into the stabilizing system comprising all three components (i), (ii) and (iii) beforehand.

In addition to the three essential components (i), (ii) and (iii) the stabilizer system may further contain auxiliary components comprising at least one surfactant and/or one or more polymeric additives, these being different from the components (i), (ii) and (iii).

In a preferred embodiment the present invention provides a process for preparing a stabilized nitrile rubber or a stabilized partially or completely hydrogenated nitrile rubber wherein said nitrite rubber or a stabilized partially or completely hydrogenated nitrile rubber comprise repeating units derived from at least one α,β-unsaturated nitrile, at least one conjugated diene and none, one or more further copolymerizable monomers, by 1) performing an emulsion polymerisation of at least one α,β-unsaturated nitrile, at least one conjugated diene and none, one or more further copolymerizable monomers in an aqueous medium resulting in a dispersion of nitrile rubber in the aqueous medium (so called "latex"),
2) subjecting said aqueous dispersion of the nitrile rubber to a coagulation and isolating the nitrile rubber, and
3) if a stabilized partially or completely hydrogenated nitrile rubber shall be prepared hydrogenating the nitrile rubber of step 2) partially or completely.

characterized in that the stabilizing system comprising components (i), (ii) and (iii) is incorporated into the nitrile rubber or a stabilized partially or completely hydrogenated nitrile rubber during or after steps 1), 2) and/or 3).

As described for the preparation of stabilized rubbers in general each component (i), (ii) and (iii) can be added separately or in the alternative all different types of mixtures of the mandatory three components can be prepared and added during or after steps 1), 2) and/or 3). Preferably the stabilizing system comprising all three components (i), (ii) and (iii) and even more preferably being present as an aqeous dispersion is prepared beforehand and added.

The present invention further relates to stabilized rubbers obtainable by any of the preceding processes, in particular obtainable by contacting the rubber with the three components (i), (ii) and (iii) being present as an aqueous dispersion.

Step 1: Emulsion Polymerisation of Nitrile Rubbers

The emulsion polymerisation of nitrile rubbers is well-known and typically water-soluble salts of anionic emulsifiers or uncharged emulsifiers are used as emulsifiers. Preference is given to using anionic emulsifiers.

As anionic emulsifiers, it is possible to use modified resin acids which are obtained by dimerization, disproportionation, hydrogenation and modification of resin acid mixtures containing abietic acid, neoabietic acid, palustric acid, laevopimaric acid. A particularly preferred modified resin acid is disproportionated resin acid (Ullmann's Encyclopedia of Industrial Chemistry, 6th Edition. Volume 31, pp. 345-355).

It is also possible to use $C_6$-$C_{22}$ fatty acids as anionic emulsifiers. They can be fully saturated or have one or more double bonds in the molecule. Examples of fatty acids are caproic acid, lauric acid, myristic acid, palmitic acid, stearic acid, oleic acid, linoleic acid, linolenic acid. The carboxylic acids are usually based on origin-specific oils or fats such as caster oil, cottonseed oil, peanut oil, linseed oil, coconut oil, palm kernel oil, olive oil, rapeseed oil, soybean oil, fish oil and beef talo, etc. (Ullmann's Encyclopedia of Industrial Chemistry, 6th Edition, Volume 13, pp. 75-108). Preferred carboxylic acids are derived from coconut fatty acid and from beef talo and are partially or fully hydrogenated.

Such carboxylic acids based on modified resin acids or fatty acids are used as water-soluble lithium, sodium, potassium and ammonium salts. The sodium and potassium salts are preferred.

Further anionic emulsifiers are sulphonates, sulphates and phosphates which are bound to an organic radical. Possible organic radicals are $C_6$ to $C_{25}$ aliphatic radicals, aromatic radicals, alkylated aromatics with 3 to 12 carbon atoms in the alkyl chain, fused aromatics and methylene-bridged aromatics, with the methylene-bridged and fused aromatics being able to be additionally alkylated. Typically the sulphates, sulphonates and phosphates are used as lithium, sodium, potassium or ammonium salts. Sodium, potassium and ammonium salts are preferred.

Examples of such sulphonates, sulphates and phosphates are Na-laurylsulphate, Na-alkylsulphonate, Na-alkylarylsulphonate, Na salts of methylene-bridged aryl sulphonates, Na salts of alkylated naphthalenesulphonates and the Na salts of methylene-bridged naphthalenesulphonates which can also be oligomerized, with the degree of oligomerization being in the range from 2 to 10. The alkylated naphthalenesulphonic acids and the methylene-bridged (and optionally alkylated) naphthalenesulphonic acids are usually present as mixtures of isomers which can also contain more than 1 sulphonic acid group (from 2 to 3 sulphonic acid groups) in the molecule. Particular preference is given to Na laurylsulphate, Na alkylsulphonate mixtures having from 12 to 18 carbon atoms, Na alkylarylsulphonates, Na diisobutylenenaphthalenesulphonate, methylene-bridged polynaphthalene-sulphonate mixtures and methylene-bridged arylsulphonate mixtures.

Uncharged emulsifiers are derived from addition products of ethylene oxide and of propylene oxide onto compounds having a sufficiently acidic hydrogen. These include, for example, phenol, alkylated phenol and alkylated amines. The average degrees of polymerization of the epoxides are in the range from 2 to 20. Examples of uncharged emulsifiers are ethoxylated nonylphenols having 8, 10 and 12 ethylene oxide units. The uncharged emulsifiers are usually not used alone but in combination with anionic emulsifiers.

Preference is given to the Na and K salts of disproportionated abietic acid and of partially hydrogenated talo fatty acid and also mixtures thereof, sodium laurylsulphate, Na alkylsulphonates, sodium alkylbenzenesulphonate and also alkylated and methylene-bridged naphthalenesulfonic acids.

The emulsifiers are used in an amount of from 0.2 to 15 parts by weight, preferably from 0.5 to 12.5 parts by weight, particularly preferably from 1.0 to 10 parts by weight, per 100 parts by weight of the monomer mixture.

Initiation of the emulsion polymerization is typically carried out using polymerization initiators which disintegrate into fee radicals. As such initiators include compounds which contain an —O—O-unit (peroxo compounds) or an —N=N— unit (azo compound).

The peroxo compounds include hydrogen peroxide, peroxodisulphates, peroxodiphosphates, hydroperoxides, peracids, peracid esters, peracid anhydrides and peroxides having two organic radicals. Salts of peroxodisulphuric acid and of peroxodiphosphoric acid used may be sodium, potassium and ammonium salts. Suitable hydroperoxides are, for example, t-butyl hydroperoxide, cumene hydroperoxide, pinane hydroperoxide, and p-menthane hydroperoxide. Suitable peroxides having two organic radicals are dibenzoyl peroxide, bis-2,4-dichlorobenzoyl peroxide, di-t-butyl peroxide, dicumyl peroxide, t-butyl perbenzoate, t-butyl peracetate, etc.

Suitable azo compounds are azobisisobutyronitrile, azobisvaleronitrile and azobiscyclohexanenitrile.

Hydrogen peroxide, hydro peroxides, peracids, peracid esters, peroxodisulphate and peroxodisphosphate are also used in combination with reducing agents. Suitable reducing agents are sulphenates, sulphinates, sulphoxylates, dithionite, sulphite, metabisulphite, disulphite, sugar, urea, thiourea, xanthogenates, thioxanthogenates, hydrazinium salts, amines and amine derivatives such as aniline, dimethylaniline, monoethanolamine, diethanolamine or triethanolamine.

Initiator systems consisting of an oxidizing agent and a reducing agent are referred to as redox systems. When redox systems are employed, salts of transition metals such as iron, cobalt or nickel are frequently also used in combination with suitable complexing agents such as sodium ethylenediaminetetraacetate, sodium nitrilotriacetate and trisodium phosphate or tetrapotassium diphosphate.

Preferred redox systems are: 1) potassium peroxodisulphate in combination with triethanolamine, 2) ammonium peroxodiphosphate in combination with sodium metabisulphite ($Na_2S_2O_5$), 3) p-methane hydroperoxide/sodium formaldehydesulphoxylate in combination with Fe(II) sulphate ($FeSO_4*7\ H_2O$), sodium ethylenediaminoacetate and trisodium phosphate, 4) cumene hydroperoxide/sodium formaldehydesulphoxylate in combination with Fe(II) sulphate ($FeSO_4*7\ H_2O$), sodium ethylenediaminoacetate and tetrapotassium disphosphate.

The amount of oxidizing agent is from 0.001 to 1 part by weight per 100 parts by weight of monomer. The molar amount of reducing agent is in the range from 50% to 500%, based on the molar amount of the oxidizing agent used.

The molar amount of complexing agents is based on the amount of transition metal used and is usually equimolar with this.

To carry out the polymerization, all or individual components of the initiator system are introduced at the beginning of the polymerization or during the polymerization. The addition of all or individual components of the initiator system in portions during the polymerization is preferred. The sequential addition enables the reaction rate to be controlled.

Typically the polymerisation is carried out in the presence of molecular weight regulating agents which are often alkyl thiols with 9 to 16 C-atoms. Said alkyl thiols or isomeric mixtures of alkyl thiols are either commercially available or can be prepared according to procedures known to in the art.

The polymerization time is in the range from 5 h to 15 h and depends essentially on the acrylonitrile content of the monomer mixture and on the polymerization temperature.

The polymerization temperature is in the range from 0 to 50° C., preferably in the range from 5 to 55° C. and more preferably in the range from 8 to 40° C.

After conversions in the range from 50 to 99%, preferably in the range from 65 to 95%, have been reached, the polymerization is stopped. For this purpose, a stopper is added to the reaction mixture. Suitable stoppers are, for example, dimethyl dithiocarbamate, Na nitrite, mixtures of dimethyl dithiocarbamate and Na nitrite, hydrazine and hydroxylamine and also salts derived therefrom, e.g. hydrazinium sulphate and hydroxylammonium sulphate, diethylhydroxylamine, diisopropylhydroxylamine, water-soluble salts of hydroquinone, sodium dithionite, phenyl-α-naphthylamine and aromatic phenols such as tert-butylcatechol or phenothiazine.

The amount of water used in the emulsion polymerization is in the range from 100 to 900 parts by weight, preferably in the range from 120 to 500 parts by weight, particularly preferably in the range from 150 to 400 parts by weight, of water per 100 pans by weight of the monomer mixture.

It is possible to add salts to the aqueous phase in the emulsion polymerization in order to reduce the viscosity during the polymerization, to adjust the pH and to buffer the pH. Salts usually used for this purpose are salts of monovalent metals in the form of potassium and sodium hydroxide, sodium sulphate, sodium carbonate, sodium hydrogencarbonate, lithium chloride, sodium chloride and potassium chloride. Preference is given to sodium and potassium hydroxide, sodium hydrogencarbonate, lithium, sodium and potassium chloride. The amounts of these electrolytes are in the range from 0 to 1 part by weight, preferably from 0 to 0.5 part by weight, per 100 parts by weight of the monomer mixture. The addition of a chloride-containing salt during the emulsion polymerization is necessary when a chloride-containing salt is to be used neither in the following coagulation nor in the subsequent washing of the coagulated nitrile rubber (feature (iv) of the process of the invention).

The polymerization can be carried out either batchwise or continuously in a cascade of stirred vessels.

To achieve a uniform course of the polymerization, only part of the initiator system is used to start the polymerization and the remainder is fed in during the polymerization. The polymerization is usually started using from 10 to 80% by weight, preferably 30-50% by weight, of the total amount of initiator. The introduction of individual constituents of the initiator system after commencement of the polymerization is also possible.

If chemically uniform nitrile rubbers shall be produced, further acrylonitrile or butadiene is introduced when the composition goes outside the azeotropic butadiene/acrylonitrile ratio. Further incrementation is preferably carried out in the case of NBR grades having acrylonitrile contents of from 10 to 34% by weight and in the case of grades containing from 40 to 50% by weight of acrylonitrile (W. Hofmann, "Nitrilkautschuk", Berliner Union Stuttgart, S. 58ff). The further dosing is, as indicated, for example, in DD 154 702, preferably carried out under computer control on the basis of a computer program.

To remove unreacted monomers and volatile constituents, the stopped latex is subjected to a steam distillation. Here, temperatures in the range from 70° C. to 150° C. are employed, with the pressure being reduced at temperatures of <100° C.

Before removal of the volatile constituents, the latex can be after-stabilized by means of an emulsifier. For this purpose, it is advantageous to use the abovementioned emulsifiers in amounts of from 0.1 to 2.5% by weight, preferably from 0.5 to 2.0% by weight, per 100 parts by weight of nitrile rubber.

Step 2:
Coagulation of the Latex

The latex having a pH of at least 6, preferably >6, is used for the coagulation. If appropriate, this pH is set by addition of a base, preferably ammonia or sodium hydroxide or potassium hydroxide.

The coagulation is carried out using at least one salt selected from the group consisting of aluminium, calcium, magnesium, sodium, potassium and lithium salts.

As anions of these salts, it is usual to use monovalent or divalent anions. Preference is given to halide, particularly preferably chloride, nitrate, sulphate, hydrogencarbonate, carbonate, formate and acetate.

Examples of suitable salts are sodium chloride, potassium chloride, calcium chloride, magnesium chloride, sodium nitrate, potassium nitrate, sodium sulphate, potassium sulphate, sodium hydrogencarbonate, potassium hydrogencarbonate, sodium carbonate, potassium carbonate, aluminium sulphate, potassium aluminium sulphate (potassium alum), sodium aluminium sulphate (sodium alum), sodium acetate, calcium acetate and calcium formate. If a water-soluble calcium salt is used for the coagulation of the latex, calcium chloride is preferred.

The salts are used in an amount of from 0.05 to 10% by weight, preferably 0.5 to 8% by weight, more preferably 1 to 5% by weight based on the solid content of the nitrile rubber dispersion (i.e. the latex)

In addition to the at least one salt selected from the above-defined group, precipitation aids can also be used in the coagulation. Possible precipitation aids are, for example, water-soluble polymers. These are non-ionic, anionic or cationic.

Examples of non-ionic polymeric precipitation aids are modified cellulose such as hydroxyalkylcellulose or methylcellulose and also adducts of ethylene oxide and propylene oxide onto compounds having an acidic hydrogen. Examples of compounds having an acidic hydrogen are: fatty acids, sugars such as sorbitol, monoglycerides and diglycerides of fatty acids, phenol, alkylated phenols, and (alkyl)phenol-formaldehyde condensates. The addition products of ethylene oxide and propylene oxide onto these compounds can have a random or blocked structure. Among these products, preference is given to those whose solubility decreases with increasing temperature. Characteristic clouding temperatures are in the range from 0 to 100° C., in particular in the range from 20 to 70° C.

Examples of anionic polymeric precipitation aids are the homopolymers and copolymers of (meth)acrylic acid, maleic acid, and maleic anhydride. The Na salt of polyacrylic acid is preferred.

Cationic polymeric precipitation aids are usually based on polyamines or on homopolymers and copolymers of (meth) acrylamide. Preference is given to polymethacrylamides and polyamines, in particular those based on epichlorohydrin and dimethylamine.

The amounts of polymeric precipitation aids are from 0.01 to 5 parts by weight, preferably from 0.05 to 2.5 parts by weight, per 100 parts by weight of nitrile rubber.

The use of other precipitation aids is also conceivable. However, it is readily possible to carry out the process in the absence of additional precipitation aids.

The latex used for the coagulation advantageously has a solids concentration in the range from 1% to 40%, preferably in the range from 5% to 35% and particularly preferably in the range from 15 to 30% by weight.

The coagulation of the latex is carried out in the temperature range from 10 to 110° C., preferably of from 20 to 100° C. and more preferably of from 50 to 98° C. The coagulation of the latex can be carried out continuously or batchwise, and is preferably carried out continuously.

In an alternative embodiment the latex which has been freed from unconverted monomers may be treated with acids at a pH value of ≤6, preferably ≤4 and more preferably ≤2 which results in the precipitation of the polymer. All mineral acids as well as organic acids may be used which allow to set the pH value in the above mentioned range. Mineral acids are preferably used. Subsequently the polymer is removed from the suspension according to known procedures which may be done either batch wise or continuously, preferably continuously.

Washing, Dewatering and Drying of the Coagulated Nitrile Rubber

After the coagulation, the nitrile rubber is usually present in the form of crumb. The washing of the coagulated NBR is therefore also referred to as crumb washing. It is possible to use either deionized water (also termed DW) or water which has not been deionized (also termed BW) for washing this coagulated crumb. Washing is carried out at a temperature in the range from 15 to 90° C., preferably at a temperature in the range from 20 to 80° C. The amount of washing water is from 0.5 to 20 parts by weight, preferably from 1 to 10 parts by weight and particularly preferably from 1 to 5 parts by weight, per 100 parts by weight of nitrile rubber.

The rubber crumb is preferably subjected to multistage washing, with the rubber crumb being partially dewatered between the individual washing stages. The residual moisture contents of the crumb between the individual washing stages are in the range from 5 to 50% by weight, preferably in the range from 7 to 25% by weight. The number of washing stages is usually from 1 to 7, preferably from 1 to 3. Washing is carried out batchwise or continuously. Preference is given to using a multistage, continuous process, with countercurrent washing being preferred in order to save water. After washing is complete, it has been found to be useful to dewater the nitrile rubber crumb. Drying of the nitrile rubber which has been subjected to preliminary dewatering is carried out in a fluidized-bed dryer or in a plate dryer. The temperatures during drying are in the range from 80 to 150° C. Preference is given to drying according to a temperature programme, with the temperature being reduced towards the end of the drying process.

Step 3: Further Chemical Conversion of the Nitrile Rubber Like Metathesis and Hydrogenation It is also possible that the preparation of the inventive nitrile rubber is followed either (i) by a metathetic degradation process or (ii) a metathetic degradation process and a subsequent hydrogenation or (iii) only a hydrogenation. This metathetic degradation process and the hydrogenation reactions are both adequately known to those skilled in the art and described in literature. The metathesis is e.g. known from WO-A-02/100941 as well as from WO-A-021100905 and is used for molecular weight degradation.

The hydrogenation can be performed with homogeneous or heterogeneous hydrogenation catalysts. It is also possible to carry out the hydrogenation in situ, i.e. in the same reaction vessel in which the optional metathetic degradation has previously also been carried out and without the necessity of isolating the degraded nitrile rubber. The hydrogenation catalyst is simply added to the reaction vessel.

The catalysts used are usually based on rhodium, ruthenium or titanium, but it is also possible to use platinum, iridium, palladium, rhenium, ruthenium, osmium, cobalt or copper either as metal or preferably in the form of metal compounds (cf., for example, U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. Nos. 4,464,515 and 4,503,196).

Suitable catalysts and solvents for a hydrogenation in the homogeneous phase are described below and are also known from DE-A-25 39 132 and EP-A-0 471 250. The selective hydrogenation can be achieved, for example, in the presence of a rhodium- or ruthenium-containing catalyst. It is possible to use, for example, a catalyst of the general formula $(R^1{}_m B)_l M X_n$.

where M is ruthenium or rhodium, the radicals $R^1$ are identical or different and are each a $C_1$-$C_8$-alkyl group, a $C_4$-$C_8$-cycloalkyl group, a $C_6$-$C_{15}$-aryl group or a $C_7$-$C_{15}$-aralkyl group. B is phosphorus, arsenic, sulphur or a sulphoxide group S=O, X is hydrogen or an anion, preferably halogen and particularly preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine) rhodium(III) chloride and tris(dimethyl sulphoxide)rhodium(III) chloride and also tetrakis(triphenylphosphine)rhodium hydride of the formula $((C_6H_5)_3P)_4RhH$ and the corresponding compounds in which the triphenylphosphine has been completely or partly replaced by tricyclohexylphosphine. The catalyst can be utilized in small amounts. An amount in the range 0.01-1% by weight, preferably in the range 0.03-0.5% by weight and particularly preferably in the range 0.1-0.3% by weight, based on the weight of the polymer, is suitable.

It is usually appropriate to use the catalyst together with a co-catalyst which is a ligand of the formula $R^1{}_m B$, where $R^1$, m and B have the meanings given above for the catalyst. Preferably, m is 3, B is phosphorus and the radicals $R^1$ can be identical or different. Preference is given to cocatalysts having trialkyl, tricycloalkyl, triaryl, triaralkyl, diaryl-monoalkyl, diaryl-monocycloalkyl, dialkyl-monoaryl, dialkyl-monocycloalkyl, dicycloalkyl-monoaryl or dicycloalkyl-monoaryl radicals.

Examples of co-catalysts may be found in, for example, U.S. Pat. No. 4,631,315. A preferred cocatalyst is triphenylphosphine. The co-catalyst is preferably used in amounts in the range 0.3-5% by weight, preferably in the range 0.5-4% by weight, based on the weight of the nitrile rubber to be hydrogenated. Furthermore, the weight ratio of the rhodium-containing catalyst to the cocatalyst is preferably in the range from 1:3 to 1:55, more preferably in the range from 1:5 to 1:45. Based on 100 parts by weight of the nitrile rubber to be hydrogenated, it is appropriate to use from 0.1 to 33 parts by weight of the cocatalyst, preferably from 0.5 to 20 parts by weight and very particularly preferably from 1 to 5 parts by weight, in particular more than 2 but less than 5 parts by weight, of cocatalyst per 100 parts by weight of the nitrile rubber to be hydrogenated.

The practical performance of said hydrogenation is adequately known to those skilled in the art from U.S. Pat. No. 6,683,136. It is usually carried out by treating the nitrile rubber to be hydrogenated in a solvent such as toluene or monochlorobenzene with hydrogen at a temperature in the range from 100 to 150° C. and a pressure in the range from 50 to 150 bar for from 2 to 10 hours.

For the purposes of the present invention, hydrogenation is a reaction of the double bonds present in the starting nitrile rubber to an extent of at least 50%, preferably 70-100%, particularly preferably 80-100%.

When heterogeneous catalysts are used, these are usually supported catalysts based on palladium which are, for example, supported on carbon, silica, calcium carbonate or barium sulphate.

In analogy to the inventive nitrile rubbers the optionally hydrogenated nitrile rubbers obtained after the metathesis and/or hydrogenation reaction of the inventive nitrile rubber may be incorporated into a vulcanizable mixture and used for producing mouldings and shaped parts. Such optionally hydrogenated nitrile rubbers have a Mooney-viscosity (ML (1+4 @100° C.)) of 1 to 50, preferably of from 1 to 40 Mooney units.

The invention also provides for the use of the rubbers, preferably nitrile rubbers of the invention for producing vulcanizable mixtures containing at least one rubber preferably nitrite rubbers according to the invention, at least one crosslinker and optionally further additives.

These vulcanizable mixtures are produced by mixing at least one stabilized rubber, preferably nitrile rubber, according to the invention, at least one crosslinker and optionally further additives.

As crosslinker, it is possible to use, for example, peroxidic crosslinkers such as bis(2,4-dichlorobenzyl) peroxide, dibenzoyl peroxide, bis(4-chlorobenzoyl) peroxide, 1,1-bis-(t-butylperoxy)-3,3,5-trimethylcyclohexane, tert-butyl perbenzoate, 2,2-bis(t-butylperoxy)butene, 4,4-di-tert-butylperoxynonyl valerate, dicumyl peroxide, 2,5-dimethyl-2,5-di(t-butylperoxy)hexane, tert-butyl cumyl peroxide, 1,3-bis(t-butylperoxyisopropyl)benzene, di-t-butyl peroxide and 2,5-dimethyl-2,5-di(t-butylperoxy)hex-3-yne.

It can be advantageous to use not only these peroxidic crosslinkers but also further additives by means of which the crosslinking yield can be increased: suitable additives of this type are, for example, triallyl isocyanurate, triallyl cyanurate, trimethylolpropane tri(meth)acrylate, triallyl trimellitate, ethylene glycol dimethacrylate, butanediol dimethacrylate, trimethylolpropane trimethacrylate, Zn diacrylate, Zn dimethacrylate, 1,2-polybutadiene or N,N'-m-phenylenedimaleimide.

The total amount of the crosslinker or crosslinkers is usually in the range from 1 to 20 phr, preferably in the range from 1.5 to 15 phr and particularly preferably the range from 2 to 10 phr, based on the nitrile rubber.

It is also possible to use sulphur in elemental soluble or insoluble form or sulphur donors as crosslinker.

Possible sulphur donors are, for example, dimorpholyl disulphide (DTDM), 2-morpholino-dithiobenzothiazol (MBSS), caprolactam disulphide, dipentamethylenethiuram tetrasulphide (DPTT), and tetramethylthiuram disulphide (TMTD).

In the sulphur vulcanization of the nitrile rubbers of the invention, too, it is possible to use further additives by means of which the crosslinking yield can be increased. However, crosslinking can in principle also be carried out using sulphur or sulphur donors alone.

Conversely, crosslinking of the nitrile rubbers of the invention can also be carried out only in the presence of the abovementioned additives, i.e. without addition of elemental sulphur or sulphur donors.

Suitable additives by means of which the crosslinking yield can be increased are, for example, dithiocarbamates, thiurams, thiazoles, sulphenamides, xanthogenates, guanidine derivatives, caprolactams and thiourea derivatives.

As dithiocarbamates, it is possible to use, for example: ammonium dimethyldithiocarbamate, sodium diethyldithiocarbamate (SDEC), sodium dibutyldithiocarbamate (SDBC), zinc dimethyldithiocarbamate (ZDMC), zinc diethyldithiocarbamate (ZDEC), zinc dibutyldithiocarbamate (ZDBC), zinc ethylphenyldithiocarbamate (ZEPC), zinc dibenzyldithiocarbamate (ZBEC), zinc pentamethylenedithiocarbamate (Z5MC), tellurium diethyldithiocarbamate, nickel dibutyldithiocarbamate, nickel dimethyldithiocarbamate and zinc diisononyldithiocarbamate.

As thiurams, it is possible to use, for example: tetramethylthiuram disulphide (TMTD), tetramethylthiuram monosulphide (TMTM), dimethyldiphenylthiuram disulphide, tetrabenzylthiuram disulphide, dipentamethylenethiuram tetrasulphide and tetraethylthiuram disulphide (TETD).

As thiazoles, it is possible to use, for example: 2-mercaptobenzothiazole (MBT), dibenzthiazyl disulphide (MBTS), zinc mercaptobenzothiazole (ZMBT) and copper-2-mercaptobenzothiazole.

As sulphonamide derivatives, it is possible to use, for example: N-cyclohexyl-2-benzothiazylsulphenamide (CBS), N-tert-butyl-2-benzothiazylsulphenamide (TBBS), N,N'-dicyclohexyl-2-benzothiazylsulphenamide (DCBS), 2-morpholinothiobenzothiazole (MBS), N-oxy-diethylenethiocarbamyl-N-tert-butylsulphenamide and oxydiethylenethiocarbamyl-N-oxyethylene-sulphenamide.

As xanthogenates, it is possible to use, for example: sodium dibutylxanthogenate, zinc isopropyl-dibutylxanthogenate and zinc dibutylxanthogenate.

As guanidine derivatives, it is possible to use, for example: diphenylguanidine (DPG), di-o-tolylguanidine (DOTG) and o-tolylbiguanide (OTBG).

As dithiophosphates, it is possible to use, for example: zinc dialkydithiophosphate (chain length of the alkyl radicals: $C_2$ to $C_{16}$), copper dialkyldithiophosphates (chain length of the alkyl radicals: $C_2$ to $C_{16}$) and dithiophosphoryl polysulphide.

As caprolactam, it is possible to use, for example, dithiobis-caprolactam.

As thiourea derivatives, it is possible to use, for example, N,N'-diphenylthiourea (DPTU), diethylthiourea (DETU) and ethylenethiourea (ETU).

Further suitable additives are, for example: zinc diaminediisocyanate, hexamethylenetetramine, 1,3-bis(citraconimidomethyl)benzene and cyclic disulphanes.

Both the additives mentioned and the crosslinkers can be used either individually or in mixtures. Preference is given to using the following substances for crosslinking the nitrile rubbers: sulphur, 2-mercaptobenzothiazol, tetramethylthiuram disulphide, tetramethylthiuram monosulphide, zinc dibenzyldithiocarbamate, dipentamethylenethiuram tetrasulphide, zinc dialkydithiophosphate, dimorpholyl disulphide, tellurium diethyldithiocarbamate, nickel dibutyldithiocarbamate, zinc dibutyldithiocarbamate, zinc dimethyldithiocarbamate and dithiobiscaprolactam.

The crosslinkers and abovementioned additives can each be used in amounts of from about 0.05 to 10 phr, preferably from 0.1 to 8 phr, in particular from 0.5 to 5 phr (single addition, in each case based on the active substance).

In sulphur crosslinking according to the invention, it may also be useful to employ further inorganic or organic substances in addition to the crosslinkers and abovementioned additives. Examples of such further substances are: zinc oxide, zinc carbonate, lead oxide, magnesium oxide, saturated or unsaturated organic fatty acids and their zinc salts, polyalcohols, amino alcohols such as triethanolamine and also amines such as dibutylamine, dicyclohexylamine, cyclohexylethylamine and polyether amines.

In addition, it is also possible to use initial vulcanization inhibitors. These include cyclohexylthiophthalimide (CTP), N,N'-dinitrosopentamethylenetetramine (DNPT), phthalic anhydride (PTA) and diphenylnitrosamine. Preference is given to cyclohexylthiophthalimide (CTP).

Apart from the addition of the crosslinker or crosslinkers, the nitrile rubber of the invention can also be mixed with further customary rubber additives.

These include, for example, the typical substances which are adequately known to those skilled in the art, for example fillers, filler activators, ozone protection agents, ageing inhibitors, antioxidants, processing aids, extender oils, plasticizers, reinforcing materials and mould release agents.

As fillers, it is possible to use, for example, carbon black, silica, barium sulphate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon (the latter preferably in powder form) or silicates.

Possible filler activators are, in particular, organic silanes such as vinyltrimethyloxysilane, vinyldimethoxymethylsilane, vinyltriethoxysilane, vinyltris(2-methoxyethoxy)silane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane or (octadecyl)methyldimethoxysilane. Further filler activators are, for example, surface-active substances such as triethanolamine and ethylene glycols having molecular weights of from 74 to 10 000 g/mol. The amount of filler activators is usually from 0 to 10 phr, based on 100 phr of the nitrile rubber.

As ageing inhibitors, it is possible to add those which have already been described in the present application in respect of coagulation of the latex to the vulcanizable mixtures. These are usually used in amounts of about 0-5 phr, preferably from 0.5 to 3 phr, based on 100 phr of the nitrile rubber.

Possible mould release agents are, for example: saturated and partially unsaturated fatty acids and oil acids and their derivatives (fatty acid esters, fatty acid salts, fatty alcohols, fatty acid amides), which are preferably employed as constituents of the mixture, also products which can be applied to the mould surface, for example products based on low molecular weight silicone compounds, products based on fluoropolymers and products based on phenolic resins.

When used as constituents of the mixture, the mould release agents are used in amounts of about 0-10 phr, preferably from 0.5 to 5 phr, based on 100 phr of the nitrile rubber.

Reinforcement by means of strength carriers (fibres) composed of glass, according to the teachings of U.S. Pat. No. 4,826,721, is also possible as is reinforcement by means of cords, woven fabrics, fibres composed of aliphatic and aromatic polyamides (Nylon®, Aramid®), polyesters and natural fibre products.

The invention further provides a process for producing vulcanizates based on at least one nitrile rubber according to the invention, which is characterized in that the above-described vulcanizable mixture is vulcanized in a shaping process, preferably using an injection-moulding process.

The invention thus likewise provides the specific shaped part which can be obtained by the abovementioned vulcanization process.

This process makes it possible to produce a large number of mouldings, e.g. a seal, a cap, a hose or a diaphragm. The nitrile rubbers of the invention having the specific ion index are particularly suitable for producing an O-ring seal, a flat seal, a corrugated sealing ring, a sealing sleeve, a sealing cap, a dust protection cap, a plug seal, a thermalinsulation hose (with or without addition of PVC), an oil cooler hose, an air intake hose, a servo control hose or a pump diaphragm.

EXAMPLES

Analytical Methods:

The nitrogen content to determine the acrylonitrile content ("ACN content") of the nitrile rubbers was determined by the Kjeldahl method in accordance with DIN 53 625. Owing to the content of polar comonomers, the nitrile rubbers are usually soluble in methyl ethyl ketone to an extent of ≥85% by weight at 20° C.

The determination of the Mooney viscosity (ML 1+4@100° C.) was performed in accordance with. ASTM D 1646 at 100° C.

The colour stability was determined as values ΔE were determined according to CIEDE 2000 as outlined below.

I. Stabilization of Nitrile Rubbers

Comparison Examples A1 to A8 and Inventive Examples A9* and A10*

The antioxidants listed in Table 1 were mixed with a dispersion of the nitrile rubber having a solid content of 17.5% by weight. The antioxidant(s) were added for all examples in the form of an aqueous dispersion having a concentration of 50% by weight. The nitrile rubber used in all examples contained 33% by weight of acrylonitrile based repeating units and 67% by weight of butadiene based repeating units. Afterwards the resulting emulsion (A2 to A8) and dispersion (A9-A10), respectively, comprising the nitrile rubber and the antioxidant(s) have been added slowly and under viguorous stirring to an aqueous solution of calcium chloride having a concentration of 0.3% by weight at 55° C. The stabilized rubber coagulates, is washed with water and dried for 16 hours at 60° C. in a vacuum oven. Subsequently the Mooney-viscosity is determined as described above. Afterwards one part of the stabilized rubber is stored for further 48 h at 110° C. and another part of the stabilized rubber is stored 7 days at 70° C. The storage takes place in an oven as described above in the specification. After the storage time elapsed the Mooney viscosity is determined once more which allows to calculate the ageing index AI according to the formula given in the specification.

The results are shown in the following Table 1:

TABLE 1

Stabilizing effect of different anti ageing compounds („ASM") on nitrile rubber

| Example | A1 | A2 | A3 | A4 | A5 | A6 | A7 | A8 | A9* | A10* |
|---|---|---|---|---|---|---|---|---|---|---|
| anti ageing compounds | — | BKF | A | B | C | A + B | A + C | B + C | A + B + C | A + B + C |
| weight ratio of anti ageing compounds to each other | | | | | | 1:1 | 1:1 | 2:1 | 1:1:1 | 2:1:2 |
| weight ratio of anti ageing compounds to rubber [g per 100 g rubber] | 0 | 0.35 | 0.55 | 0.55 | 0.55 | 0.55 | 0.55 | 0.55 | 0.55 | 0.55 |

TABLE 1-continued

Stabilizing effect of different anti ageing compounds („ASM") on nitrile rubber

| Example | A1 | A2 | A3 | A4 | A5 | A6 | A7 | A8 | A9* | A10* |
|---|---|---|---|---|---|---|---|---|---|---|
| mmol of anti ageing compounds per 100 g rubber | 0 | 1.03 | 1.29 | 1.04 | 0.79 | 1.04 | 1.04 | 0.95 | 1.04 | 1.04 |
| mmol of OH-groups in anti ageing compounds per 100 g rubber | 0 | 2.06 | 1.29 | 1.04 | 2.37 | 1.73 | 2.09 | 1.59 | 1.73 | 1.87 |
| Rubber after isolation before ageing | | | | | | | | | | |
| Mooney-Viscosity MVI[Mu] | 111 | 43 | 41 | 41 | 42 | 41 | 42 | 44 | 41 | 42 |
| Rubber after ageing at 110° C./48 h | | | | | | | | | | |
| SS (ST) (%) | >100 | 9 | 60 | 163 | 35 | 30 | 14 | 8 | 0 | 9 |
| Rubber after ageing at 70° C./7 days | | | | | | | | | | |
| SS (LT) (%) | >100 | 11 | 19 | 7 | 8 | 0 | 2 | 6 | 3 | 2 |
| Ageing stability | | | | | | | | | | |
| Ageing index AI (%) | >100 | 20 | 79 | 170 | 43 | 30 | 16 | 14 | 3 | 11 |
| Factor F | 1 | 1 | 1 | 1 | 1 | 1 | 1 | 1 | 1 | 1 |
| corrected ageing index AI (corr) (%) | >100 | 20 | 79 | 170 | 43 | 30 | 16 | 14 | 3 | 11 |

(Examples A 1 to A10; Inventive Examples being marked with an asterisk "*")
wherein
A shall mean Irganox ® 1520 this being 2-Methyl-4,6-bis(octylsulfanylmethyl)phenol (BASF AG, Deutschland)
B shall mean Irganox ® 1076 this being n-Octadecyl-β-(4-hydroxy-3,5-di-tert-butyl-phenyl)-propionate (BASF AG, Deutschland) and
C shall mean Wingstay ® L this being Poly(dicyclopentadiene-co-p-cresol) (Omnova, Italien)
BKF shall mean Vulkanox ® BKF, this being 2,2'-Methylen-bis(6-tert.butyl)paracresol (Lanxess Deutschland GmbH)

Example A1 reveals that unstabilized rubber shows substantial ageing phenomena. The degradation already becomes recognizable during the first drying step resulting in a Mooney viscosity of 111 Mu which is more than double as high compared to rubber stabilized with at least one anti ageing compound. Stabilization of the rubber with one single anti ageing compound A, B, or C (Examples A3, A4, A5) does not result in sufficient storage stability. Using two anti ageing compounds A and B, A and C, or B and C leads to an improvement in particular with specific regard to the long-term stabilization (SS (LT)), with the combination of B and C giving the relative best results, however, the stabilization is still not sufficient. The stabilizing effect of combined anti ageing compounds B and C is similar to the stabilizing effect achieved with Vulkanox BKF if comparable mmol concentrations of the anti ageing compounds are used. Vulkanox BKF, however, possesses an undesired toxicological and environmental profile as discussed above and is furtheron difficult to emulsify which necessitates its use in the form of a dispersion. The three component combination of anti ageing compounds A, B, and C pursuant to the present invention gives a stabilizing effect which is substantially higher than the single and two-component systems. In particular using the three components A, B, and C results in an improvement of the storage stability expressed by the AI index than what a person skilled in the art would have expected by adding up the stabilizing effects achieved by each of the two component systems with the stabilizing effect achieved by the complementary third component. Variations in the relative amounts of the three components A, B, and C may be used to adapt the stabilizing effect to the specific needs.

II. Colour Stability of Nitrile Rubbers

Examples and Comparison Examples B1-B16

In order to test the stabilizing effect of the inventive stabilizer combination different aqueous dispersions of different nitrile rubbers after stopping the polymerisation were used. The aqueous dispersions each had a solid content of nitrile rubber of 18±4% by weight. The nitrile rubbers had the characteristics as given in the below Table 2 with regard to the content of the different repeating units and the Mooney-Viskosität (ML 1+4 at 100° C.). The aqueous dispersion of the nitrile rubber was pumped via a supply pipe from the storage vessel into a stirred vessel. An aqueous dispersion of the anti ageing components A, B, and C (weight ratio of anti ageing compounds to each other was 1:1:1) or in the alternative of Vulkanox BKF (with a 50% by weight solid content each) was stored in a separate storage tank, fed to another supply pipe from which it was injected into the supply pipe containing the nitrile rubber dispersion.

Afterwards the aqueous dispersion of the rubber comprising the additional anti ageing components was subjected to coagualation by the addition of calcium- or aluminium salts or by the addition of an acid to decrease the pH value, washed, dewaterd and dried according to a procedure known in the art and as described above in the specification.

Subsequently the stabilized rubbers were subjected to the respective ageing conditions (48 h/110° C. and 70° C./7 days respectively) in an oven and the Mooney viscosity was determined thereafter. Based on the Mooney viscosities measured, the respective storage stabilities SS (ST) and SS (LT) and the ageing indes AI have been calculated.

The results as provided in Table 2 show that the ageing index AI is recognizably smaller if the rubber has been stabilized with the three components system pursuant to the invention compared to the known stabilizer Vulkanox BKF or the two component mixtures of phenolic anti ageing compounds or compared to a combination of phenolic anti ageing compounds with phosphites (the latter being generally taught in U.S. Pat. No. 5,116,534).

Even if the known anti ageing compound Vulkanox® BKF is used in a higher amount the stabilizing effect is still less pronounced than with the combination of stabilizers according to the invention.

In Table 2 the following meanings shall apply:

The termonomer in examples B13 and B14 is methacrylic acid

NW represents 2,2'-Methylene bis[6-nonyl-p-cresol] (Naugawhite)

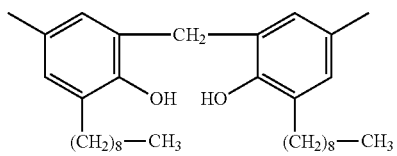

TNPP represents trisnonylphenyl phosphite (CAS 26523-78-4).

To characterize the colour stability the values ΔE were determined according to CIEDE 2000. For this purpose 18 g of a stabilized nitrile rubber sample were pressed into a round disc and were then analyzed with a spectrometer MiniScan EZ supplied by the company Hunter Associates Lab., Inc.

To compare the colour stability the respective values ΔE were determined twice, first on a sample of the rubber after isolation and drying before any ageing and secondly on a sample of the same stabilized rubber after an ageing process at 110° C. for 48 hours. The results are shown in Table 3.

An improvement of the colour stability expressed by lower ΔE values can be recognized depending on the Mooney stability and depending on the acrylonitrile and butadiene content of the rubber. Only the extent of ageing is different. Independently from the salt used for coaguation an improvement of the colour stability may be observed.

TABLE 2

Ageing behaviour of nitrile rubber stabilized with different anti ageing components

| | Content of repeating units based on monomers [% by weight] | | | Mooney viscosity | salt used for coagulation | anti ageing compounds (AAC) | | | | AI [%] | Factor F | AI (corr) [%] |
|---|---|---|---|---|---|---|---|---|---|---|---|---|
| | Acrylonitrile | butadiene | others | | | composition | total concentration of AAC (phr) | SS (ST) | SS (LT) | | | |
| B1* | 18 | 82 | — | 45 | acid | A + B + C | 0.25 | 2 | 7 | 9 | 1 | 9 |
| B2 | 18 | 82 | — | 45 | | BKF | 0.25 | 11 | 7 | 18 | 1 | 18 |
| B3* | 28 | 72 | — | 60 | Ca-salt | A + B + C | 0.55 | 10 | 0 | 10 | 1 | 10 |
| B4 | 28 | 72 | — | 61 | | BKF | 0.44 | 15 | 3 | 18 | 1 | 18 |
| B5* | 33 | 67 | — | 30 | Ca-salt | A + B + C | 0.55 | 3 | 0 | 3 | 1 | 3 |
| B6 | 33 | 67 | — | 30 | | BKF | 0.4 | 17 | 10 | 27 | 1 | 27 |
| B7* | 33 | 67 | — | 45 | Ca-salt | A + B + C | 0.55 | 7 | 4 | 11 | 1 | 11 |
| B8 | 33 | 67 | — | 45 | | BKF | 0.35 | 9 | 7 | 16 | 1 | 16 |
| B9* | 33 | 67 | — | 110 | Ca-salt | A + B + C | 0.55 | 0 | 13 | 13 | 1 | 13 |
| B10 | 33 | 67 | — | 110 | | BKF | 0.4 | 7 | 12 | 19 | 1 | 19 |
| B11* | 48.5 | 51.5 | — | 75 | Ca-salt | A + B + C | 0.55 | 6 | 3 | 9 | 1 | 9 |
| B12 | 48.5 | 51.5 | — | 77 | | BKF | 0.4 | 16 | 4 | 20 | 1 | 20 |
| B13* | 26.5 | 56.8 | 6.7 | 38 | Ca-salt | A + B + C | 1.2 | 257 | 24 | 281 | 0.04 | 11 |
| B14 | 26.5 | 66.8 | 6.7 | 38 | | BKF/TNPP | 1 | 388 | 39 | 427 | 0.04 | 17 |
| B15* | 21 | 79 | — | 57 | Al-salt | A + B + C | 0.55 | 15 | 5 | 20 | 0.5 | 10 |
| B16 | 21 | 79 | — | 57 | | NW/TNPP | 0.6 | 66 | 5 | 71 | 0.5 | 36 |

(Inventive examples are marked with an asterisk "*")

TABLE 3

Colour stability of stabilized nitrile rubbers

| | Content of repeating units based on monomers [% by weight] | | Mooney Viscosity [Mooney units] | Coagulation by | Anti-ageing compounds | c(ASM) [phr] | ΔE | L* | | a* | | b* | |
|---|---|---|---|---|---|---|---|---|---|---|---|---|---|
| Ex. | ACN | BD | | | Composition | | | BA | AA | BA | AA | BA | AA |
| B1* | 18 | 82 | 45 | acid | A + B + C | 0.25 | 8.0 | 49.1 | 31.83 | 2.21 | 7.37 | 14.98 | 12.43 |
| B2 | | | | | BKF | 0.25 | 16.73 | 49.5 | 44.67 | 1.01 | 6.1 | 17.47 | 27.2 |
| B15* | 21 | 79 | 57 | Al-salt | A + B + C | 0.55 | 10.18 | 51.3 | 28.76 | 1.58 | 9.1 | 16.19 | 14.66 |
| B16 | | | | | NW/TNPP | 0.6 | 21.71 | 44.7 | 38.52 | 0.63 | 8.44 | 14.17 | 20.46 |
| B9* | 33 | 67 | 110 | Ca-salt | A + B + C | 0.55 | 5.80 | 44.26 | 28.32 | 3.81 | 2.92 | 5.77 | 2.46 |
| B10 | | | | | BKF | 0.4 | 13.65 | 46.73 | 45.83 | 1.7 | 4.05 | 8.88 | 17.51 |

(ageing conditions: 48 h/110° C.; "BA" means before said ageing; "AA" means after said ageing, "ACN" means acrylonitrile, "BD" means butadiene)

III. Stabilization of SBR Rubbers

Comparison Example C1 and Inventive Examples C2

A dispersion of the anti ageing compounds as indicated in the below Table 4 have been mixed with a SBR-dispersion having a solid concentration of 19.5% by weight. The SBR contained in the SBR dispersion contains 23% by weight of styrene units and 77% by weight of butadiene units, had a Mooney viscosity (ML 1+4 at 100° C.) of 43. The resulting dispersion was then added at a temperature of 62° C. to a 3% by weight solution of sodium chloride at a pH value of 4 under vigourous stirring.

The stabilized SBR obtained thereby was washed with water and dried at 60° C. for 16 hours in a vacuum oven.

For the ageing investigations the stabilized SBR rubber was stored for 48 h at a temperature of 110° C. and 7 days at a temperature of 70'C in the same oven used in the above examples. Subsequently to both ageing procedures the Mooney viscosity was measured again.

TABLE 4

Stabilizing effect of different anti ageing compounds ("ASM") on SBR rubber

| | Example | |
|---|---|---|
| | C1 | C2* |
| anti ageing compounds | BKF | A + B + C |
| weight ratio of anti ageing compounds to each other | | 1:1:1 |
| weight ratio of anti ageing compounds to rubber [g per 100 g rubber] | 0.40 | 0.55 |
| mmol of anti ageing compounds per 100 g rubber | 1.17 | 1.04 |
| mmol of OH-groups in anti ageing compounds per 100 g rubber | 2.35 | 1.73 |
| Rubber after isolation before ageing | | |
| Mooney-Viscosity MV1[Mu] | 40 | 40 |
| Rubber after ageing at 110° C./48 h | | |
| SS (ST) (%) | 11 | 3 |
| ΔE (CIEDE 2000) | 13.95 | 9.33 |
| Rubber after ageing at 70° C./7 days | | |
| SS (LT) (%) | 4 | 2 |
| Ageing index AI (%) | 15 | 5 |
| Factor F | 1 | 1 |
| corrected ageing index AI (corr) (%) | 15 | 5 |

(Comparison example C1 and inventive examples C2 being marked with an asterisk "*")
wherein A = Irganox ® 1520; B = Irganox ® 1076; C = Wingstay ® L; BKF = Vulkanox ® BKF with the defined structures mentioned above.

As for the nitrile rubber a better ageing stabilization in terms of the Ageing Index AI is also recognized for the SBR rubber when using three stabilizing components in accordance with the present invention compared to using the conventionally known Vulkanox® BKF even if the latter is used in a higher molar concentration. Similarly the colour stability in terms of the ΔE (CIEDE 2000) value is improved.

What is claimed is:

1. A stabilized rubber comprising:
rubber; and
(i) at least one compound of formula (I)

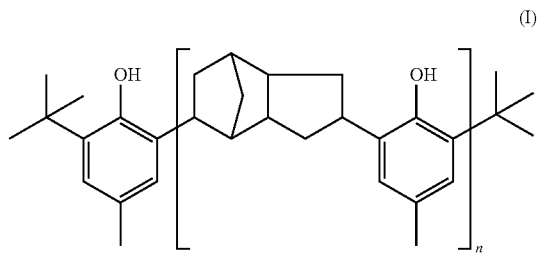

wherein
n is 1 to 10;
(ii) at least one compound of general formula (II)

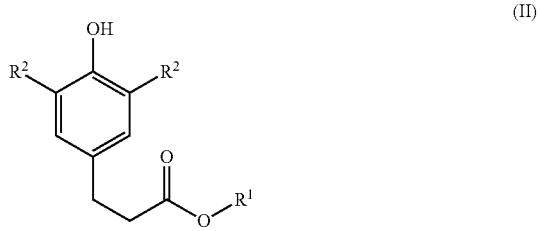

wherein
$R^1$ means hydrogen; straight chain or branched, saturated or one or more times unsaturated, unsubstituted or substituted alkyl; saturated or one or more times unsaturated carbocyclyl or hetercyclyl; aryl; heteroaryl, atylalkyl, heteroarylalkyl, or polyoxyalkylene ether; and
$R^2$ are identical or different and mean straight chain or branched $C_1$-$C_5$ alkyl or $C_5$-$C_6$ cycloalkyl; and
(iii) at least one compound of general formula (III)

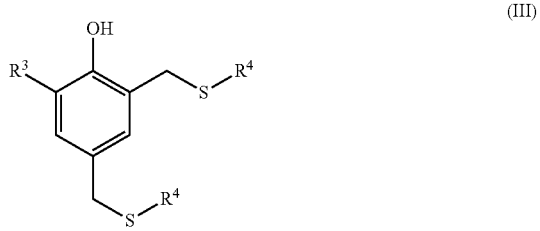

wherein
$R^3$ means straight chain or branched $C_1$-$C_{14}$ alkyl; and
$R^4$ means hydrogen, straight chain or branched, saturated or one or more times unsaturated, unsubstituted or substituted alkyl; saturated or one or more times unsaturated carbocyclyl or hetercyclyl; aryl; heteroaryl, arylalkyl, heteroarylalkyl, alkoxy, arylm, heteroaryloxy, alkylthio or arylthio,
wherein the components (i), (ii) and (iii) are present in a corresponding weight ratio of (i):(ii):(iii) of (0.1-10):1:(0.1-10).

2. The stabilized rubber according to claim 1, wherein the rubber is an unsaturated, partially or fully hydrogenated rubber selected from the group consisting of nitrile rubbers (NBR), hydrogenated nitrile rubbers (HNBR), styrene-butadiene copolymers (SBR), polychloroprene (CR), polybutadiene (BR), isobutylene-isoprene copolymers (IIR), brominated isobutylene-isoprene copolymers (BIIR), chlorinated isobutylene-isoprene copolymers (CIIR), butadiene-$C_{1-4}$-alkyl acrylate copolymers (ABR), acrylonitrile isoprene rubber (NIR), styrene isoprene rubber (SIR), polyisoprene (IR), natural rubber (NR), epoxidized natural rubber (ENR), and mixtures thereof.

3. The stabilized rubber according to claim 1, wherein the rubber is NBR or SBR.

4. The stabilized rubber according to claim 1, comprising:
(i) at least one compound of formula (I);
(ii) at least one compound of general formula (II), wherein
  $R^1$ means hydrogen; straight chain or branched, saturated or one or more times unsaturated, unsubstituted or substituted $C_1$-$C_{30}$ alkyl; saturated or one or more times unsaturated $C_3$-$C_{10}$ carbocyclyl; or $C_3$-$C_{10}$ heterocyclyl; $C_6$-$C_{24}$ aryl; $C_5$-$C_{23}$ heteroaryl; $C_7$-$C_{30}$ arylalkyl; $C_6$-$C_{29}$ heteroarylalkyl; or polyoxyalkylene ether;
  $R^2$ are identical or different, and mean straight chain or branched $C_1$-$C_4$ alkyl; and
(iii) at least one compound of general formula (III), wherein
  $R^3$ means straight chain or branched $C_1$-$C_{14}$ alkyl; and
  $R^4$ are identical or different, and mean hydrogen; straight chain or branched, saturated or one or more times unsaturated, unsubstituted or substituted $C_1$-$C_{30}$ alkyl; saturated or one or more times unsaturated $C_3$-$C_{10}$ carbocyclyl or $C_3$-$C_{10}$ heterocyclyl; $C_6$-$C_{24}$ aryl; $C_5$-$C_{23}$ heteroaryl, $C_7$-$C_{30}$ arylalkyl, $C_6$-$C_{29}$ heteroarylalkyl, $C_1$-$C_{24}$ alkoxy, $C_6$-$C_{24}$ aryloxy, or $C_5$-$C_{23}$ heteroaryloxy, $C_1$-$C_{24}$ alkythio, or $C_6$-$C_{24}$ arylthio.

5. The stabilized rubber according to claim 4, comprising:
(i) at least one compound of formula (I);
(ii) at least one compound of general formula (II), wherein
  $R^1$ means straight chain or branched $C_{15}$-$C_{18}$ alkyl; and
  $R^2$ are identical and selected from the group consisting of methyl, ethyl, n-propyl, iso-propyl, n-butyl, iso-butyl, tert.-butyl, and $C_6$ cycloalkyl; and
(iii) at least one compound of general formula (III), wherein
  $R^3$ means straight chain or branched $C_1C_4$ alkyl; and
  $R^4$ are identical and mean straight chain or branched, saturated or one or more times unsaturated, unsubstituted or substituted $C_6$-$C_{14}$ alkyl, with substituents selected from the group consisting of amino, amido, alkoxy, aryloxy, thio, alkylthio, arylthio, carbonyl, carboxy, oxycarbonyl, oxo, epoxy, or sulfoxyl.

6. The stabilized rubber according to claim 4, comprising:
(i) a compound of formula (I),
(ii) a compound of formula (II) with $R^1$ being straight chain $C_{18}$-alky, and both $R^2$ being tert.butyl, and
(iii) a compound of formula (III) with both $R^4$ being n-octyl and $R^3$ being methyl, and
wherein the rubber has a total amount of 0.01 to 10.0% by weight of the three components (i), (ii) and (iii) based on 100 parts by weight of the rubber.

7. The stabilized rubber according to claim 6, wherein:
the rubber is SBR, or NBR having repeating units derived from acrylonitrile, butadiene, and none or one further copolymerizable monomer selected from acrylic acid or methacrylic acid;
the stabilized rubber does not contain any further antioxidants other than compounds (i), (ii) and (iii);
the stabilized rubber comprises a total amount 0.05 to 5.0% by weight of the three components (i), (ii) and (iii) based on 100 parts by weight of the rubber; and
the three components (i), (ii) and (iii) are present in a corresponding weight ratio of (i):(ii):(iii) of 1:1:1 or 2:1:2.

8. The stabilized rubber according to claim 1, wherein the three components (i), (ii) and (iii) are present in a corresponding weight ratio of (i):(ii):(iii) of (0.5-2):1:(0.5-2).

9. The stabilized rubber according of claim 1, wherein the three components (i), (ii) and (iii) are present in a corresponding weight ratio of (i):(ii):(iii) of (1-2):1:(1-2).

10. The stabilized rubber according to claim 1, further comprising (iv) at least one phosphite antioxidant selected from the group consisting of tris (nonylphenyl) phosphite, tris (2,4-di-t-butyl phenyl) phosphite, aikylaryl phosphites, and mixtures of the aforementioned.

11. The stabilized rubber according to claim 10, wherein the stabilized rubber does not contain any further antioxidants other than compounds (i), (ii) and (iii) and the at least one phosphite antioxidant.

12. A process for preparing the stabilized rubber according to claim 1, the process comprising bringing the components (i), (ii), (iii), and optionally (iv) at least one phosphite antioxidant, into contact with the rubber,
(1) during the preparation of the rubber, including the polymerisation and the workup of the rubber, the latter comprising coagulation and isolation, or
(2) in one or more further chemical conversion steps subsequent to the preparation of the rubber that comprises a metathesis reaction, a hydrogenation reaction or an analogous reaction comprising grafting, and/or
(3) if the rubber is nitrile rubber, during the preparation of vulcanizable mixtures based on the nitrile rubber, or after the nitrile rubber is subjected to one or more further chemical conversions.

13. The process according to claim 12, wherein each component (i), (ii), (iii) and optionally (iv) is brought into contact with the rubber either separately or in the alternative in any type of combination of components (i), (ii), (iii), and optionally (iv).

14. The process according to claim 13, wherein the components (i), (ii), (iii) and optionally (iv) or any type of combination thereof are used as a dispersion.

15. A stabilized rubber obtained by the process according to claim 12.

16. A vulcanizable mixture comprising at least one stabilized rubber according to claim 1 and at least one cross-linking agent.

17. A process for the preparation of the vulcanizable mixture according to claim 16, the process comprising mixing the at least one stabilized rubber with the at least one cross-linking agent.

18. A process for preparing a stabilized nitrile rubber or a stabilized partially or completely hydrogenated nitrile rubber, the process comprising:
1) performing an emulsion polymerisation of at least one α,β-unsaturated nitrile, at least one conjugated diene, and no, one or more further copolymerizable monomers in an aqueous medium to produce a dispersion of nitrile rubber in the aqueous medium, 2) subjecting the dispersion of nitrile rubber to a coagulation, and isolating the nitrile rubber, and
3) if preparing a stabilized partially or completely hydrogenated nitrile rubber, hydrogenating the nitrile rubber of step 2) partially or completely, and incorporating the components, (i) at least one compound of formula (I)

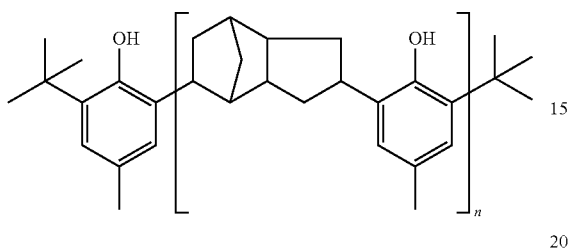

wherein
n is 1 to 10;
(ii) at least one compound of general formula (II)

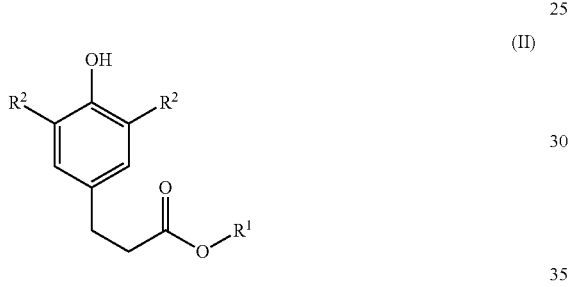

wherein
R$^1$ means hydrogen; straight chain or branched, saturated or one or more times unsaturated, unsubstituted or substituted alkyl; saturated or one or more times unsaturated carbocyclyl or hetercyclyl; aryls, heteroaryl, arylalkyl, heteroarylalkyl, or polvoxyalkylene ether; and
R$^2$ are identical or different and mean straight chain or branched C$_1$-C$_6$ alkyl or C$_5$-C$_6$ cycloalkyl;
(iii) at least one compound of general formula (III)

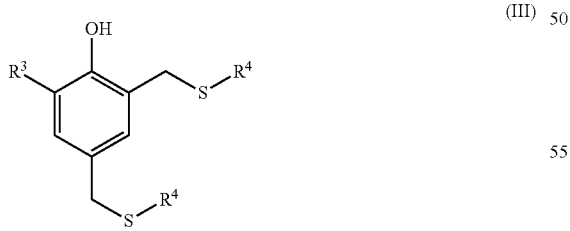

wherein
R$^3$ means straight chain or branched C$_1$-C$_{14}$ alkyl; and
R$^4$ means hydrogen, straight chain or branched saturated or one or more times unsaturated, unsubstituted or substituted alkyl; saturated or one or more times unsaturated carbocyclyl or hetercycly; aryl; heteroaryl, arylalkyl, heteroarylalkyl, alkoxy, aryloxy, heteroaryloxy, alkylthio or arylthio, and
optionally (iv) at least one phosphite antioxidant;
into the nitrile rubber or stabilized partially or completely hydrogenated nitrile rubber during or after steps 1), 2) and/or 3).

19. A vulcanizate comprising a stabilized rubber comprising rubber, and;
(i) at least one compound of formula (I)

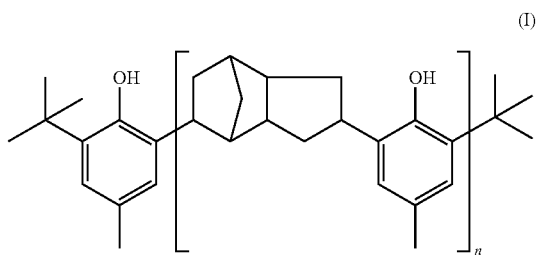

wherein
n is 1 to 10;
(ii) least one compound of general formula (II)

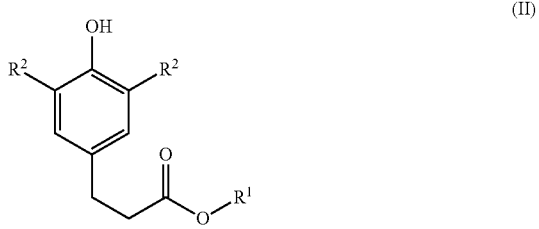

wherein
R$^1$ means hydrogen; straight chain or branched, saturated or one or more times unsaturated, unsubstituted or substituted alkyl; saturated or one or more times unsaturated carbocyclyl or hetercyclyl; aryl; heteroaryl, arylalkyl, heteroarylalkyl, or polyoxyalkylene ether; and
R$^2$ are identical or different and mean straight chain or branched C$_1$-C$_6$ alkyl or C$_5$-C$_6$ cycloalkyl; and
(iii) at least one compound of general formula (III)

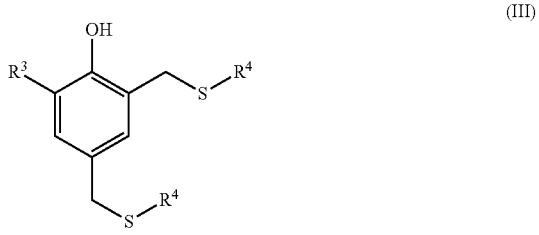

wherein
R$^3$ means straight chain or branched C$_1$-C$_{14}$ alkyl; and
R$^4$ means hydrogen, straight chain or branched, saturated or one or more times unsaturated, unsubstituted or substituted alkyl; saturated or one or more times unsaturated carbocylyl or hetercyclyl;

aryl; heteroaryl, arylalkyl, heteroarylalkyl, alkoxyl, aryloxy, heteroaryloxy, alkylthio or arylthio.

20. A process for preparing the vulcanizate according to claim 19, the process comprising subjecting the stabilized rubber and at least one cross-linking agent to a vulcanization.

\* \* \* \* \*